US008352797B2

(12) United States Patent  
Black et al.

(10) Patent No.: US 8,352,797 B2
(45) Date of Patent: Jan. 8, 2013

(54) SOFTWARE FAULT ISOLATION USING BYTE-GRANULARITY MEMORY PROTECTION

(75) Inventors: Richard John Black, Cambridge (GB);
Paul Barham, Cambridge (GB);
Manuel Costa, Cambridge (GB);
Marcus Peinado, Bellevue, WA (US);
Jean-Philippe Martin, Mountain view, WA (US); Periklis Akritidis, Cambridge (GB); Austin Donnelly, Cambridge (GB); Miguel Castro, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/633,326

(22) Filed: Dec. 8, 2009

(65) Prior Publication Data

US 2011/0138476 A1    Jun. 9, 2011

(51) Int. Cl.
*G06F 11/30* (2006.01)
(52) U.S. Cl. ............................ 714/38.1; 710/28; 710/36
(58) Field of Classification Search ................. 714/38.1; 710/28, 36
See application file for complete search history.

(56) References Cited

U.S. PATENT DOCUMENTS

| | | | |
|---|---|---|---|
| 5,761,477 A | 6/1998 | Wahbe et al. | |
| 6,654,903 B1 | 11/2003 | Sullivan, Jr. et al. | |
| 7,010,607 B1* | 3/2006 | Bunton | 709/228 |
| 7,437,613 B2 | 10/2008 | Baumberger | |
| 7,574,709 B2 | 8/2009 | Erlingsson et al. | |
| 2002/0108028 A1* | 8/2002 | Nunoe | 712/233 |
| 2002/0131404 A1* | 9/2002 | Mehta et al. | 370/352 |
| 2002/0144001 A1* | 10/2002 | Collins et al. | 709/250 |
| 2003/0151760 A1* | 8/2003 | Berndt et al. | 358/1.14 |
| 2004/0220774 A1* | 11/2004 | Agarwal et al. | 702/183 |
| 2005/0010804 A1* | 1/2005 | Bruening et al. | 713/200 |
| 2005/0015637 A1* | 1/2005 | Van Eijndhoven et al. | 713/400 |
| 2005/0033980 A1* | 2/2005 | Willman et al. | 713/200 |
| 2005/0044108 A1* | 2/2005 | Shah et al. | 707/104.1 |
| 2006/0021054 A1* | 1/2006 | Costa et al. | 726/25 |
| 2006/0136910 A1* | 6/2006 | Brickell et al. | 718/1 |
| 2006/0242402 A1 | 10/2006 | Swift et al. | |
| 2006/0288345 A1* | 12/2006 | Rice et al. | 718/1 |
| 2007/0204259 A1* | 8/2007 | Wilner et al. | 717/124 |

(Continued)

OTHER PUBLICATIONS

Abadi, Budiu, Erlingsson, Ligati, "Control-Flow Integrity Principles, Implementations, and Applications", retrieved on Oct. 8, 2009 at <<http://users.soe.ucsc.edu/~abadi/Papers/cfi-tissec-revised.pdf>>, ACM Transactions on Information and System Security (TISSEC), vol. 13, No. 1, Article 4, Oct. 2009, pp. 1-41.

(Continued)

*Primary Examiner* — Chae Ko
(74) *Attorney, Agent, or Firm* — Lee & Hayes, PLLC

(57) ABSTRACT

Software fault isolation methods using byte-granularity memory protection are described. In an embodiment, untrusted drivers or other extensions to a software system are run in a separate domain from the host portion of the software system, but share the same address space as the host portion. Calls between domains are mediated using an interposition library and access control data is maintained for substantially each byte of relevant virtual address space. Instrumentation added to the untrusted extension at compile-time, before load-time, or at runtime and added by the interposition library enforces the isolation between domains, for example by adding access right checks before any writes or indirect calls and by redirecting function calls to call wrappers in the interposition library. The instrumentation also updates the access control data to grant and revoke access rights on a fine granularity according to the semantics of the operation being invoked.

19 Claims, 11 Drawing Sheets

U.S. PATENT DOCUMENTS

| | | | |
|---|---|---|---|
| 2008/0005794 A1* | 1/2008 | Inoue et al. | 726/22 |
| 2008/0052711 A1* | 2/2008 | Forin et al. | 718/100 |
| 2008/0114804 A1* | 5/2008 | Foti | 707/103 R |
| 2008/0313383 A1* | 12/2008 | Morita et al. | 711/6 |
| 2009/0019430 A1* | 1/2009 | Jaeger et al. | 717/141 |
| 2009/0113187 A1* | 4/2009 | Hansen et al. | 712/225 |
| 2009/0119748 A1* | 5/2009 | Yao et al. | 726/2 |
| 2009/0249289 A1 | 10/2009 | Akritidis et al. | |
| 2009/0282474 A1* | 11/2009 | Chen et al. | 726/21 |
| 2010/0306746 A1* | 12/2010 | Barua et al. | 717/136 |

OTHER PUBLICATIONS

Abadi, Budiu, Erlingsson, Ligatti, "Control-Flow Integrity: Principles, Implementations, and Applications", ACM, Proceedings of Conference on Computer and Communications Security (CCS), 2005, pp. 340-353.

Akritidis, Cadar, Raiciu, Costa, Castro, "Preventing memory error exploits with WIT", retrieved on Oct. 8, 2009 at <<http://www.stanford.edu/~cristic/papers/wit-sp-ieee-08.pdf>>, IEEE Computer Society, Proceedings of Symposium on Security and Privacy, May 2008, pp. 263-277.

Anderson, Gay, Naik, "Lightweight annotations for controlling sharing in concurrent data structures", ACM SIGPLAN Notices, Proceedings of PLDI, vol. 44, No. 6, Jun. 2009, pp. 98-109.

Barham, Dragovic, Fraser, Hand, Harris, Ho, Neugebauer, Pratt, Warfield, "Xen and the Art of Virtualization", retrieved on Oct. 8, 2009 at <<http://research.microsoft.com/en-us/um/people/tharris/papers/2003-sosp.pdf>>, ACM, Proceedings of Symposium on Operating Systems Principles (SOSP), 2003, pp. 164-177.

Bershad, Savage, Pardyak, Sirer, Fiuczynski, Becker, Chambers, Eggers, "Extensibility, Safety and Performance in the SPIN Operating System", retrieved on Oct. 8, 2009 at <<http://web.cecs.pdx.edu/~walpole/class/cs533/papers/spin.pdf>>, ACM, Proceedings of Symposium on Operating Systems Principles, 1995, pp. 267-283.

Bos, Samwel, "Safe Kernel Programming in the OKE", retrieved on Oct. 8, 2009 at <<http://ieeexplore.ieee.org/stamp/stamp.jsp?arnumber=1019235&isnumber=21924>>, IEEE, Proceedings of OPENARCH, 2002, pp. 141-152.

Castro, Costa, Martin, Peinado, Akritidis, Donnelly, Barham, Black, "Fast Byte-Granularity Software Fault Isolation", ACM, Proceedings of Symposium on Operating Systems Principles (SOSP), Oct. 11, 2009, pp. 45-58.

Chapin, Rosenblum, Devine, Lahiri, Teodosiu, Gupta, "Hive: Fault Containment for Shared-Memory Multiprocessors", retrieved on Oct. 8, 2009 at <<http://www.cs.cmu.edu/~dga/15-712/F07/lectures/17-fault-containment.pdf>>, ACM Proceedings of Symposium on Operating Systems Principles (SOSP), Dec. 1995, pp. 12-25.

Chapin, Hive: Operating System Fault Containment for Shared-Memory Multiprocessors, Technical Report No. CSL-TR-97-712, Doctoral Thesis, Stanford University, Jul. 1997, pp. 1-156.

Chen, Noble, "When Virtual is Better Than Real", retrieved on Oct. 8, 2009 at <<http://www.eecs.umich.edu/virtual/papers/chen01.pdf>>, IEEE Computer Society, Proceedings of Workshop on Hot Topics in Operating Systems (HOTOS), May 2001, pp. 1-6.

Chou, Yang, Chelf, Hallem, Engler, "An Empirical Study of Operating Systems Errors", retrieved on Oct. 8, 2009 at <<http://pdos.csail.mit.edu/6.097/readings/osbugs.pdf>>, ACM, Proceedings of Symposium on Operating Systems Principles, 2001, pp. 73-88.

Christmansson, Chillarege, "Generation of an Error Set that Emulates Software Faults-Based on Field Data", retrieved on Oct. 8, 2009 at <<http://www.chillarege.com/archive/RamPapers/errorsetftcs96.pdf>>, IEEE Computer Society, Proceedings of Symposium on Fault-Tolerant Computing (FTCS), 1996, pp. 1-10.

Chubb, "Get More Device Drivers out of the Kernel!", retrieved on Oct. 8, 2009 at <<http://ertos.nicta.com.au/publications/papers/Chubb_04b.pdf>>, Proceedings of Linux Symposium, Jul. 2004, pp. 149-162.

Criswell, Lenharth, Dhurjati, Adve, "Secure Virtual Architecture: A Safe Execution Environment for Commodity Operating Systems", retrieved on Oct. 8, 2009 at <<http://llvm.org/pubs/2007-SOSP-SVA.pdf>>, ACM SIGOPS Operating Systems Review (SOSP), vol. 41, No. 6, Dec. 2007, pp. 351-366.

Engler, Kaashoek, O'Toole Jr., "Exokernel: An Operating System Architecture for Application-Level Resource Management", retrieved on Oct. 8, 2009 at <<http://pdos.csail.mitedu/6.828/2008/readings/engler95exokernel.pdf>>, ACM, Proceedings of Symposium on Operating Systems Principles (SOSP), 1995, pp. 251-266.

Erlingsson, Abadi, Vrable, Budiu, Necula, "XFI: Software Guards for System Address Spaces", retrieved on Oct. 8, 2009 at <<http://pdos.csail.mit.edu/6.893/2009/readings/xfi.pdf>>, USENIX Association, Proceedings of Symposium on Operating Systems Design and Implementation (OSDI), vol. 7, 2006, pp. 1-14.

Forin, Golub, Bershad, "An I/O System for Mach 3.0", retrieved on Oct. 8, 2009 at <<http://www.shakthimaan.com/downloads/hurd/An%20IO%20System%20for%20Mach.pdf>>, USENIX Association, Proceedings of Mach Symposium, 1991, pp. 163-176.

Fraser, Hand, Neugebauer, Pratt, Warfield, Williamson, "Safe Hardware Access with the Xen Virtual Machine Monitor", retrieved on Oct. 8, 2009 at <<http://www.cl.cam.ac.uk/research/srg/netos/papers/2004-oasis-ngio.pdf>>, Proceedings of Workshop on Operating System and Architectural Support for the on demand IT InfraStructure (OASIS), Oct. 2004, pp. 1-10.

Ganapathy, Renzelmann, Balakrishnan, Swift, Jha, "The Design and Implementation of Microdrivers", retrieved on Oct. 8, 2009 at <<http://discolab.rutgers.edu/malware/papers/asplos2008.pdf>>, ACM, Proceedings of Conference on Architectural Support for Programming Languages and Operating Systems (ASPLOS), vol. 43, No. 3, Mar. 2008, pp. 168-178.

Gay, Ennals, Brewer, "Safe Manual Memory Management", ACM, Proceedings of Symposium on Memory Management (ISMM), Oct. 21, 2007, pp. 2-14.

Hackett, Das, Wang, Yang, "Modular Checking for Buffer Overflows in the Large", retrieved on Oct. 8, 2009 at <<http://research.microsoft.com/pubs/70226/tr-2005-139.pdf>>, ACM, Proceedings of Conference on Software Engineering, 2006, pp. 232-241.

Hartig, Hohmuth, Liedtke, Schonberg, Wolter, "The Performance of u-Kernel-Based Systems", retrieved on Oct. 8, 2009 at <<http://i30www.ira.uka.de/research/documents/l4ka/ukernel-performance.pdf>>, ACM, Proceedings of Symposium on Operating Systems Principles (SOSP), Oct. 5, 1997, pp. 1-15.

Herder, Bos, Gras, Homburg, Tanenbaum, "Fault Isolation for Device Drivers", retrieved on Oct. 8, 2009 at <<http://www.cs.vu.nl/~ast/publications/dsn-2009.pdf>>, Conference on Dependable Systems and Networks, 2009, pp. 1-10.

Herder, Bos, Gras, Homburg, Tanenbaum, "Minix 3: A Highly Reliable, Self-Repairing Operating System", retrieved on Oct. 8, 2009 at <<http://portal.acm.org/ft_gateway.cfm?id=1151391&type=pdf&coll=GUIDE&dl=GUIDE&CFID=56889085&CFTOKEN=19724565>>, ACM SIGOPS Operating Systems Review, vol. 40, No. 3, Jul. 2006, pp. 80-89.

Hunt, Larus, "Singularity: Rethinking the Software Stack", retrieved on Oct. 8, 2009 at <<http://research.microsoft.com/pubs/69431/osr2007_rethinkingsoftwarestack.pdf, ACM SIGOPS Operating Systems Review, vol. 41, No. 2, Apr. 2007, pp. 37-49.

Jim, Morrisett, Grossman, Hicks, Cheney, Wang, "Cyclone: A safe dialect of C", retrieved on Oct. 8, 2009 at <<http://www.cs.umd.edu/projects/cyclone/papers/cyclone-safety.pdf>>, USENIX Association, Proceedings of Technical Conference, 2002, pp. 275-288.

Katcher, "PostMark: A New File System Benchmark", retrieved on Oct. 8, 2009 at <<http://communities.netapp.com/servlet/JiveServlet/download/2609-1551/Katcher97-postmark-netapp-tr3022.pdf>>, Network Appliance, Inc., 1997, pp. 1-8.

Kiriansky, Bruening, Amarasinghe, "Secure Execution Via Program Shepherding", retrieved on Oct. 8, 2009 at <<http://groups.csail.mit.edu/cag/rio/security-usenix.pdf>>, USENIX Association, Proceedings of Security Symposium, 2002, pp. 191-206.

Leslie, Chubb, Fitzroy-Dale, Gotz, Gray, Macpherson, Potts, Shen, Elphinstone, Heiser, "User-level Device Drivers: Achieved Performance", retrieved on Oct. 8, 2009 at <<http://ertos.nicta.com.au/publications/papers/Leslie_CFGGMPSEH_05-tr.pdf>>, Journal of Computer Science and Technology, vol. 20, 2005, pp. 1-17.

LeVasseur, Uhlig, Stoess, Gotz, "Unmodified Device Driver Reuse and Improved System Dependability via Virtual Machines", retrieved on Oct. 8, 2009 at <<http://l4ka.org/publications/2004/LeVasseur04UnmodifiedDriverReuse.pdf>>, USENIX Association, Proceeding of Symposium on Operating System Design and Implementation (OSDI), vol. 6, Dec. 2004, pp. 1-14.

McCamant, Morrisett, "Evaluating SFI for a CISC Architecture", retrieved on Oct. 8, 2009 at <<http://groups.csail.mit.edu/pag/pubs/pittsfield-usenix2006.pdf>>, USENIX Association, Proceedings of Security Symposium, vol. 15, Article 15, 2006, pp. 1-16.

Menon, Schubert, Zwaenepoel, "TwinDrivers: Semi-Automatic Derivation of Fast and Safe Hypervisor Network Drivers from Guest OS Drivers", retrieved on Oct. 8, 2009 at <<http://portal.acm.org/ft_gateway.cfm?id =1508279&type=pdf&coll=GUIDE&dl=GUIDE&CFID=56889013&CFTOKEN=41755964>>, ACM, Proceedings of Conference on Architectural Support for Programming Languages and Operating Systems (ASPLOS), Mar. 2009, pp. 301-312.

Microsoft Phoenix SDK, retrieved on Oct. 9, 2009 at <<http://connect.microsoft.com/phoenix>>, Microsoft Corporation, 2009, pp. 1.

Necula, McPeak, Weimer, "CCured Type-Safe Retrofitting of Legacy Code", retrieved on Oct. 8, 2009 at <<https://www.cs.virginia.edu/~weimer/p/p128-necula.pdf>>, ACM, Proceedings of Principles of Programming Languages (POPL), vol. 37, No. 1, Jan. 16, 2002, pp. 128-139.

Necula, Lee, "Safe Kernel Extensions Without Run-Time Checking", retrieved on Oct. 8, 2009 at <<http://www.cs.arizona.edu/~collberg/Teching/620/1999/Handouts/imurdock1.pdf>>, ACM SIGOPS Operating Systems Review, vol. 30, No. S1, 1996, pp. 229-243.

One, "Smashing the Stack for Fun and Profit", retrieved on Oct. 8, 2009 at <<http://insecure.org/stf/smashstack.html>>, 2009, pp. 1-16.

Seawright, MacKinnon, "VM/370—a study of multiplicity and usefulness", retrieved on Oct. 8, 2009 at <<http://cseweb.ucsd.edu/classes/wi08/cse221/papers/seawright79.pdf>>, IBM Systems Journal, vol. 18, No. 1, Mar. 1979, pp. 4-17.

Seltzer, Endo, Small, Smith, "Dealing With Disaster: Surviving Misbehaved Kernel Extensions", retrieved on Oct. 8, 2009 at <<www.usenix.org/publications/library/proceedings/.../full.../seltzer.ps>>, USENIX Association, Proceedings of Symposium on Operating Systems Design and Implementation (OSDI), Oct. 1996, pp. 1-16.

Silver, "Implementation and Analysis of Software Based Fault Isolation", retrieved on Oct. 8, 2009 at <<http://www.cs.dartmouth.edu/reports/TR96-287.pdf>>, Dartmouth College, Technical Report: PCS-TR96-287, Jun. 1996, pp. 1-32.

Small, Seltzer, "MiSFIT: A Tool for Constructing Safe Extensible C++ Systems", retrieved on Oct. 8, 2009 at <<www.dogfish.org/chris/papers/misfit/misfit-ieee.ps>>, USENIX Association, Proceedings of Conference on Object-Oriented Technologies, Jun. 1997, pp. 38-48.

Small, Seltzer, "MiSFIT: A tool for constructing safe extensible C++ systems", IEEE Concurrency, vol. 6, No. 3, Jul. 1998, pp. 34-41.

Strom, Yemini, "Typestate: A Programming Language Concept for Enhancing Software Reliability", retrieved on Oct. 8, 2009 at <<http://www.cs.cmu.edu/~aldrich/papers/classic/tse12-typestate.pdf>>, IEEE Transactions on Software Engineering, vol. SE-12, No. 1, Jan. 1986, pp. 157-171.

Sugerman, Venkitachalam, Lim, "Virtualizing I/O Devices on VMware Workstation's Hosted Virtual Machine Monitor", retrieved on Oct. 8, 2009 at <<http://www.vmware.com/pdf/usenix_io_devices.pdf>>, USENIX Association, Proceedings of Technical Conference, Jun. 25, 2001, pp. 1-14.

Sullivan, Chillarege, "Software Defects and their Impact on System Availability—A Study of Field Failures in Operating Systems", retrieved on Oct. 8, 2009 at <<http://www.chillarege.com/archive/RamPapers/mvsaparftcs21.pdf>>, IEEE Computer Society, Proceedings of Symposium on Fault-tolerant Computing, 1991, pp. 2-9.

Swift, Bershad, Levy, "Improving the Reliability of Commodity Operating Systems", retrieved on Oct. 8, 2009 at <<http://nooks.cs.washington.edu/nooks-tocs.pdf>>, ACM, Proceedings of Symposium on Operating Systems Principles, 2003, pp. 207-222.

Swift, Bershad, Levy, "Improving the Reliability of Commodity Operating Systems", ACM Transactions on Computer Systems (TOCS), vol. 23, No. 1, Feb. 2005, pp. 77-110.

Swift, Annamalai, Bershad, Levy, "Recovering Device Drivers", ACM Transactions on Computer Systems (TOCS), vol. 24, No. 4, Nov. 2006, pp. 333-360.

Swift, Annamalai, Bershad, Levy, "Recovering Device Drivers", retrieved on Oct. 8, 2009 at <<http://nooks.cs.washington.edu/recovering-drivers.pdf>>, USENIX Association, Proceedings of Symposium on Operating Systems Design and Implementation (OSDI), vol. 6, 2004, pp. 1-16.

User-Mode Driver Framework (UMDF), retrieved on Oct. 9, 2009 at <<http://www.microsoft.com/whdc/driver/wdf/umdf.mspx>>, Microsoft Corporation, 2008, pp. 1-3.

Wahbe, Lucco, Anderson, Graham, "Efficient Software-Based Fault Isolation", retrieved on Oct. 8, 2009 at <<http://www.eecs.harvard.edu/~greg/cs255sp2004/wahbe93efficient.pdf>>, ACM, Proceedings of Symposium on Operating Systems Principles (SOSP), 1993, pp. 203-216.

Waldspurger, "Memory Resource Management in VMware ESX Server", retrieved on Oct. 8, 2009 at <<http://www.waldspurger.org/carl/papers/esx-mem-osdi02.pdf>>, ACM SIGOPS Operating Systems Review, Proceedings of Symposium on Operating Systems Design and Implementation (OSDI), vol. 36, No. SI, Dec. 2002, pp. 181-194.

Whitaker, Shaw, Gribble, "Scale and Performance in the Denali Isolation Kernel", retrieved on Oct. 8, 2009 at <<http://denali.cs.washington.edu/pubs/distpubs/papers/denali_osdi.pdf>>, ACM SIGOPS Operating Systems Review, Proceedings of Symposium on Operating Systems Design and Implementation (OSDI), vol. 36, No. SI, Dec. 2002, pp. 195-209.

Williams, Reynolds, Walsh, Sirer, Schneider, "Device Driver Safety Through a Reference Validation Mechanism", retrieved on Oct. 8, 2009 at <<http://www.cs.cornell.edu/people/egs/papers/nexus-ddrm-tr.pdf>>, USENIX Association, Proceedings of Symposium on Operating Systems Design and Implementation (OSDI), May 2008, pp. 1-15.

Windows Driver Kit (WDK), retrieved on Oct. 9, 2009 at <<http://www.microsoft.com/wdk>>, Microsoft Corporation, 2009, pp. 1-2.

Witchel, Rhee, Asanovic, "Mondrix: Memory Isolation for Linux using Mondriaan Memory Protection", retrieved on Oct. 8, 2009 at <<http://groups.csail.mit.edu/cag/scale/papers/mmp-sosp2005.pdf>>, ACM SIGOPS Operating Systems Review, Proceedings of Symposium on Operating Systems Principles (SOSP), vol. 39, No. 5, Dec. 2005, pp. 31-44.

Zhou, Condit, Anderson, Bagrak, Ennals, Herren, Necula, Brewer, "SafeDrive: Safe and Recoverable Extensions Using Language-Based Techniques", retrieved on Oct. 8, 2009 at <<http://www.eecs.berkeley.edu/~necula/Papers/deputy-osdi06.pdf>>, USENIX Association, Proceedings of Symposium on Operating Systems Design and Implementation (OSDI), 2006, pp. 45-60.

Tanenbaum, Herder, Bos, "Can We Make Operating Systems Reliable and Secure?", retrieved on Oct. 9, 2009 at <<http://ads.computer.org/portal/site/computer/menuitem.5d61c1d591162e4b0ef1bd108bcd45f3/index.jsp?, May 2006.

* cited by examiner

SOFTWARE FAULT ISOLATION USING BYTE-GRANULARITY MEMORY PROTECTION

BACKGROUND

Current operating systems run many drivers and in order to achieve good performance, most of these drivers are fully trusted, i.e. they run in the operating system kernel and share the address space of the kernel. However, driver bugs cause serious problems and are a major cause of unreliability in operating systems. Such bugs can result in data corruption, crashes, security breaches etc.

A number of fault isolation techniques have been proposed which, for example, isolate drivers, or other kernel extensions, in separate protection domains to contain faults or move the extensions to user mode processes. Other techniques have been proposed which require changes to driver code or hardware. However, these known techniques are not widely used because they cannot isolate existing kernel extensions with low overhead on standard hardware.

The embodiments described below are not limited to implementations which solve any or all of the disadvantages of known fault isolation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Software fault isolation using byte-granularity memory protection is described. In an embodiment, untrusted drivers or other extensions to a software system are run in a separate domain from the host portion of the software system, but share the same address space as the host portion. Calls between domains are mediated using an interposition library and access control data is maintained for substantially each byte of relevant virtual address space. Instrumentation added to the untrusted extension at compile-time, before load-time, or at runtime, and added by the interposition library enforces the isolation between domains, for example by adding access right checks before any writes or indirect calls and by redirecting function calls to call wrappers in the interposition library. The instrumentation also updates the access control data to grant and revoke access rights on a fine granularity according to the semantics of the operation being invoked.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
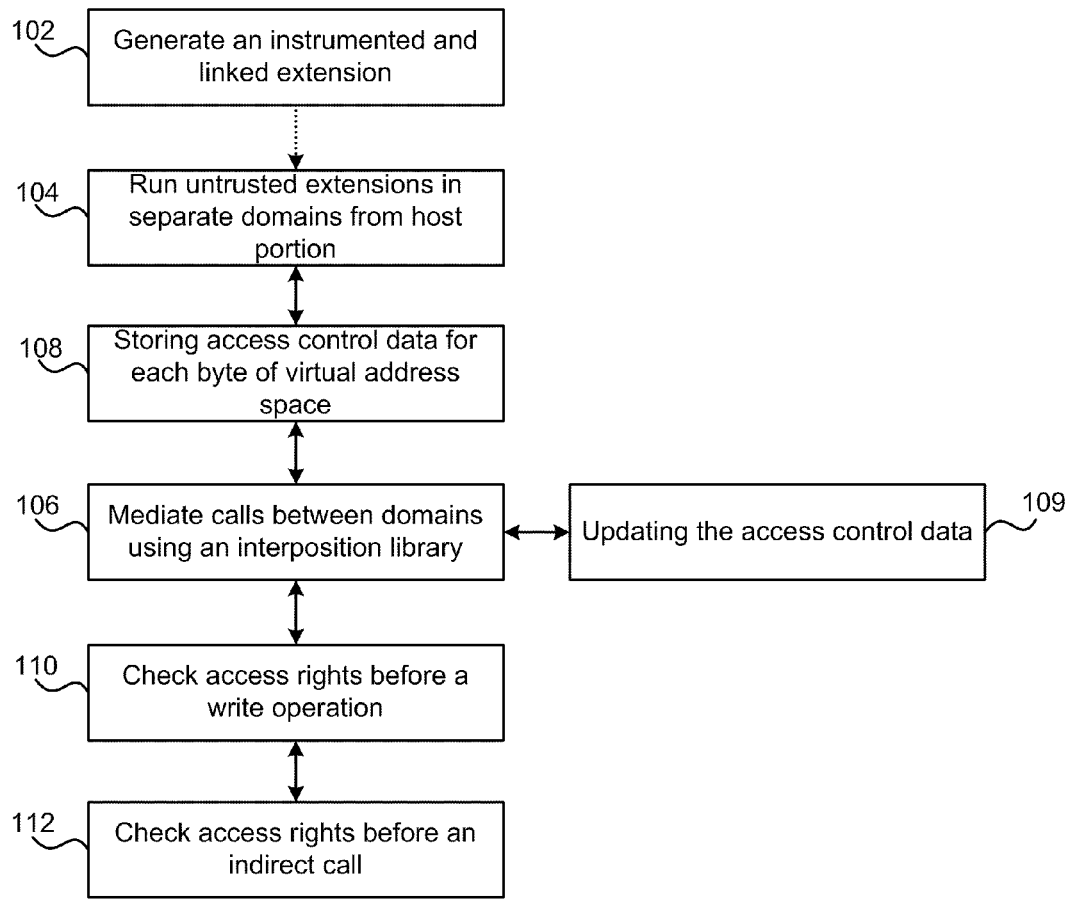
FIG. 1 is a flow diagram of a software fault isolation technique.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Isolating existing kernel extensions, such as drivers, file systems and web servers, with low overhead on standard hardware is a difficult problem because of the frequent communication between an extension and the kernel and because of the complex interface used for the communication. Incorrect use of the complex kernel API (application programming interface) may cause writes anywhere or execution of arbitrary code.

The following example extension code can be used to demonstrate some of the difficulties in isolating kernel extensions. It shows how a simplified encrypted file system driver might process a read request in the Windows Driver Model (WDM).

```
void ProcessRead(PDEVICE_OBJECT d, IRP *irp) {
    KEVENT e;
    int j=0;
    PIO_STACK_LOCATION isp;
    KeInitializeEvent(&e,NotificationEvent,FALSE);
    SetParametersForDisk(irp);
    IoSetCompletionRoutine(irp,&DiskReadDone,&e,TRUE,
    TRUE,TRUE);
    IoCallDriver(diskDevice,irp);
    KeWaitForSingleObject(&e,Executive,KernelMode,
    FALSE,NULL);
    isp = IoGetCurrentIrpStackLocation(irp);
    for(;j < isp-> Parameters.Read.Length; j++) {
        irp->AssociatedIrp.SystemBuffer[j] ^= key;
    }
    IoCompleteRequest(irp,IO_DISK_INCREMENT);
}
```

The driver registers the function ProcessRead with the kernel when it is loaded. When an application reads data from a file, the kernel creates an I/O Request Packet (IRP) to describe the operation and calls ProcessRead to process it. ProcessRead sends the request to a disk driver to read the data from disk and then decrypts the data (by XORing the data with key). SetParametersForDisk and DiskReadDone are driver functions that are not shown in the example. Process-Read starts by initializing an event synchronization object e on the stack. Then it modifies the IRP to tell the disk driver what to do. Windows® drivers are stacked and IRPs contain a stack location for each driver in the driver stack. This IRP stack location has parameters for the operation that the driver should perform and a completion routine that works like a return address. ProcessRead sets the parameters for the disk in the next IRP stack location and it sets DiskReadDone as the completion routine (with argument &e). Then it passes the IRP to the disk driver and waits on e. When the disk read completes, the kernel calls the DiskReadDone function, which signals event e. This unblocks ProcessRead allowing it to decrypt the data read from disk. When it finishes, the driver calls IoCompleteRequest to complete the request and tells the kernel the data is ready. The example shows some of the complexity of the WDM interface and it shows that drivers interact with the kernel frequently.

The following description describes new software fault isolation techniques which use byte-granularity memory protection to isolate kernel extensions and which collectively may be referred to as byte-granularity isolation (BGI). The techniques can isolate existing OS (operating system) drivers with low overhead and no modification to the source code and can also be used to isolate any kernel extensions and extensions to other software systems, such as browser plug-ins and extensions to Microsoft® Office. For the purposes of explanation only, the techniques are described below with reference to isolating kernel extensions and in particular drivers; however the techniques are more widely applicable to other extensions. Any references to a kernel is by way of example only and could alternatively refer to any host portion of an extensible software system. The techniques are also capable of being implemented on standard hardware.

Figure 2:
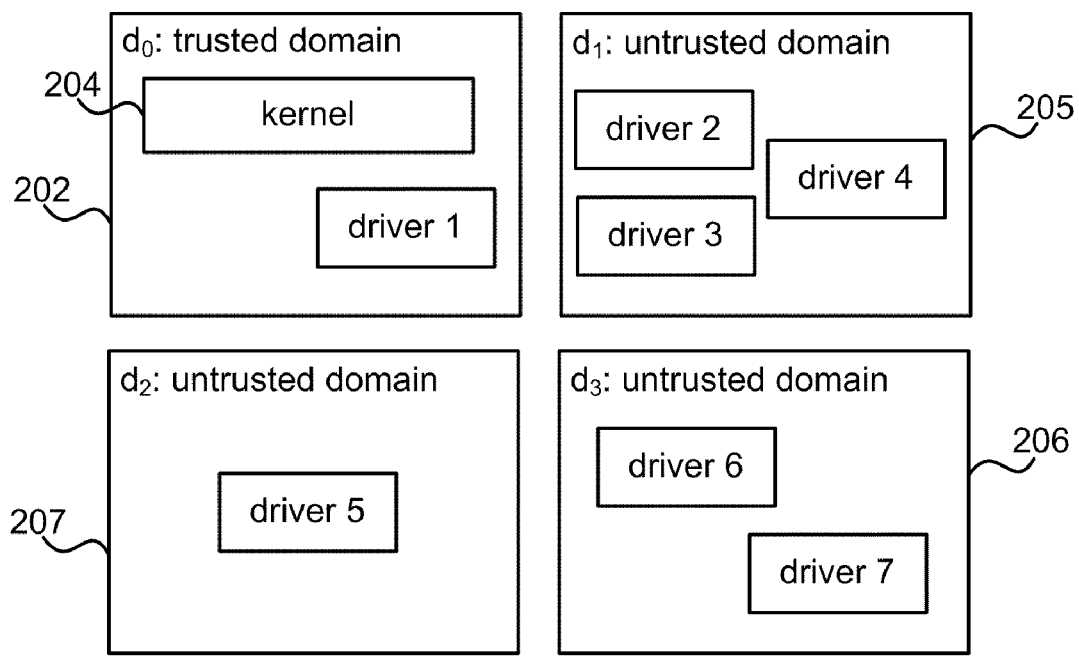
FIG. 2 is a schematic diagram showing the partition of extensions into domains.

FIG. 1 is a flow diagram of a software fault isolation technique which may be implemented on standard hardware using a modified compiler, an extensible compiler with a plug-in, or rewriter, and an interposition library. The method comprises generating an instrumented and linked extension (block 102), which may be referred to as a BGI extension or BGI-isolated extension (of which a BGI driver or BGI-isolated driver is an example). As described in more detail below, the instrumented and linked extension may be generated (in block 102) at compile-time, at any time before load-time or at runtime. The BGI extension is run (at run-time), in a separate domain from the host portion of an extensible software system (block 104), e.g. as shown in FIG. 2. The host portion of an extensible software system may, for example, be the kernel of the software system and FIG. 2 and many of the subsequent examples show a kernel by way of example only. The domain 202 in which the kernel 204 is run may be referred to as a trusted domain and any domains 205-207 in which an instrumented and linked extension (drivers 2-7) is run may be referred to as untrusted domains. Trusted extensions (driver 1) may also be run with the kernel in the trusted domain 202.

Each untrusted domain can run one or more untrusted extensions (e.g. domain 207 runs a single driver, driver 5 and domain 205 runs drivers 2-4). Frequently, the functionality needed to drive a device is implemented by multiple driver binaries that communicate directly through custom interfaces and these drivers may be placed in the same domain. A thread is considered to be running in a domain when it executes code that runs in that domain.

Figure 3:
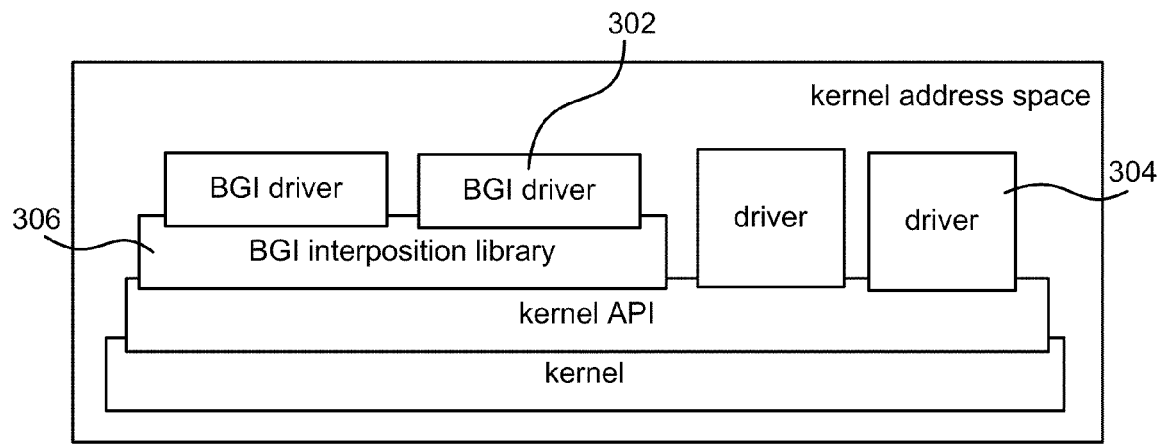
FIG. 3 is a schematic diagram showing the layered architecture of byte-granularity isolation (BGI)

Calls between domains, such as calls between untrusted extensions and the host portion, are mediated by the interposition library (block 106). BGI does not constrain memory accesses performed by threads running in the trusted domain. BGI-isolated drivers 302 can run alongside trusted extensions 304 on the same system, as shown in the schematic diagram of the layered architecture of FIG. 3 which again uses a kernel as an example of a host portion of an extensible software system. Instrumentation inserted into the extension (in block 102), in combination with instrumentation inserted by the interposition library 306 enforces isolation between the domains.

Although the extension runs in a separate domain, all the domains, whether trusted or untrusted, share the same address space. Access control data is maintained for each byte (or substantially each byte) of virtual address space (block 108) and this access control data specifies which domains can access the byte and how they can access it. The virtual address space includes both system space and user space. System space is shared by all processes and each process has a private user space. All BGI domains share system space and the process user spaces.

In some embodiments, the access control data may be maintained in relation to relevant virtual address space only, i.e. access control data is maintained for each byte, or substantially each byte, of relevant virtual address space. The term 'relevant virtual address space' is used herein to refer to virtual address space that is used by the host portion of the extensible software system (which may be a kernel). A virtual address is considered unused or not relevant if writing to the virtual address does not cause a write operation to memory or device registers etc. In an example, if the system (hardware, operating system etc) is such that certain virtual addresses cannot be backed (e.g. by memory, device registers etc) then these virtual addresses are considered not relevant and do not form part of the 'relevant virtual address space'. The proportion of a system which is relevant may be dependent upon the system design.

Figure 4:
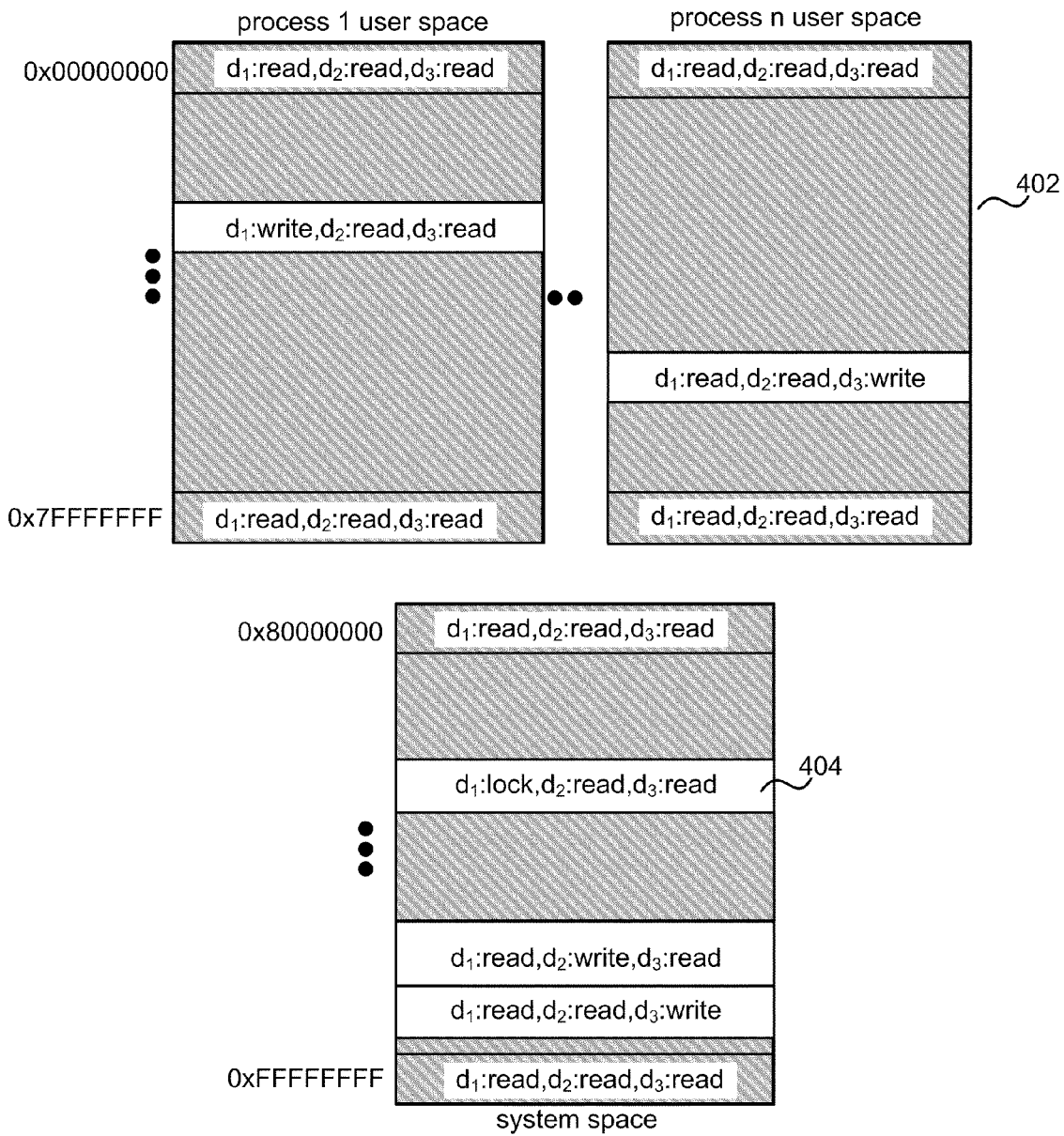
FIG. 4 is a schematic diagram of example access control lists (ACLs) for the domains shown in FIG. 2.

In many embodiments the access control data comprises an access control list (ACL) and an ACL is maintained for each byte of virtual address space. FIG. 4 shows example ACLs for the domains in FIG. 2. The shaded boxes 402 correspond to the default ACL that only allows domains to read the byte. The other ACLs grant some of the domains more rights on accesses to the corresponding byte, for example, one of the ACLs (box 404) grants domains $d_1$ and $d_2$ (domains 205, 206 in FIG. 2) the right to use a shared lock. In further embodiments, an ACL may be maintained for substantially each byte of virtual address space. It will be appreciated that in some examples, there may be regions of virtual address space whose access control policy can be defined in a different way and as a result an ACL may not be maintained for each byte within such a region. In other embodiments, the fine-granularity memory protection may be implemented on other size units, instead of per byte, e.g. 2 bytes, 1 bit etc. The access rights recorded in the access control data (which in many embodiments is an ACL) are granted and revoked by code inserted into the extension when the instrumented and linked extension is generated (in block 102) and by the interposition library according to the semantics of the operation being invoked. The access rights are checked before write operations (block 110) and may also be checked before other operations, such as indirect calls (block 112), as is described in more detail below. The checks (in block 110) may be performed before each individual write operation, before a group of write operations (e.g. where one access check covers several write operations) or in another manner. This byte-granularity memory protection allows extensive checking with low overhead.

The software fault isolation techniques described herein can grant access precisely to the bytes that a domain should access and can check accesses to these bytes efficiently regardless of where they are in memory. The techniques can also control precisely when a domain is allowed to access these bytes because they can grant and revoke access efficiently.

Although the arrows in FIG. 1 show a particular order for the method blocks, this is by way of example only and other arrangements of the method blocks may alternatively be used. It will also be appreciated that the method blocks may be performed concurrently.

Figure 5:
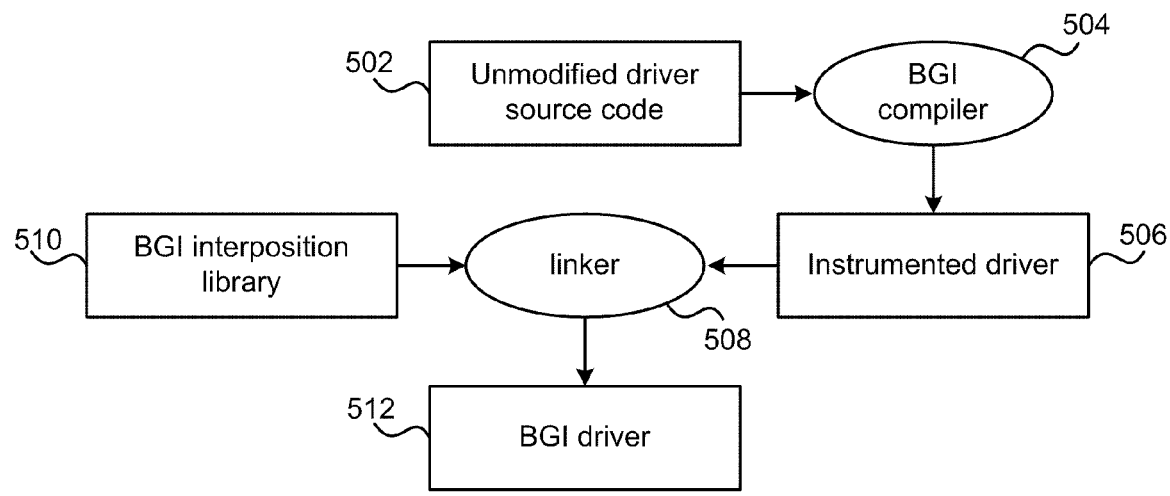
FIGS. 5 and 7 are schematic diagrams showing example methods of generating a BGI extension.

The BGI extension, which may be a driver, may be generated (in block 102) using a modified compiler or an extensible compiler with a plug-in as shown in FIG. 5. A user (who may be the writer of the driver) compiles the unmodified source code driver 502 with the compiler 504 which has the appropriate plug-in (also referred to as the BGI compiler). The compiling step generates an instrumented driver 506, which is then linked, using linker 508, with the BGI interposition library 510 to generate the instrumented and linked driver 512 (also referred to as the BGI driver). In an example implementation, the compiler 504 may be implemented using the Phoenix framework (http://connect.microsoft.com/Phoenix).

Figure 6:
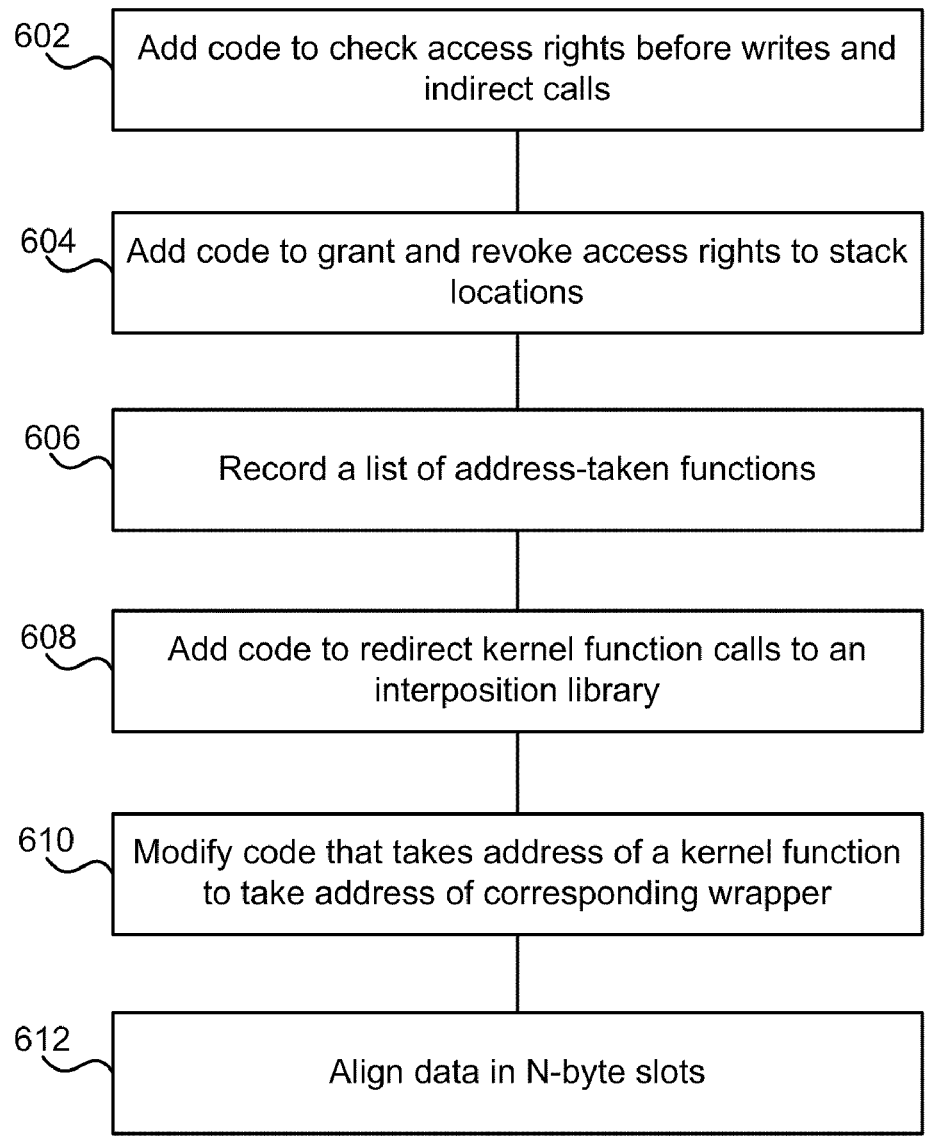
FIG. 6 is a flow diagram showing an example method of operation of a BGI compiler.

FIG. 6 is a flow diagram of an example method of operation of the compiler 504. This example uses a kernel as an example of a host portion of an extensible software system, but it will be appreciated that the method is also applicable to other host portions. The compiler 504 adds instrumentation to check rights on writes (i.e. to check that the domain is allowed to write to each byte of virtual address space being written) and in some embodiments also adds instrumentation to check rights on indirect calls (block 602), i.e. to check that the domain is allowed to indirectly call the particular function. The compiler also adds instrumentation to grant and revoke write access to stack locations in the virtual address space (block 604). In addition, the compiler may record a list of address-taken functions which can then be used by the interposition library to grant indirect call rights when the extension is loaded (block 606). To ensure that all communication between untrusted extensions and the kernel is mediated by the interposition library, the compiler rewrites all calls to kernel functions to call the corresponding wrappers in the interposition library (block 608). The compiler may also modify extension code that takes the address of a kernel function to take the address of the corresponding kernel wrapper in the interposition library (block 610). This has the effect that indirect calls to kernel functions are also redirected to the interposition library. In some embodiments, the compiler may also align data (block 612) and this optimization is described in more detail below.

Although the blocks in FIG. 6 are shown in a particular order, it will be appreciated that the method blocks may be performed in any order and two or more method blocks may be performed concurrently.

Figure 7:
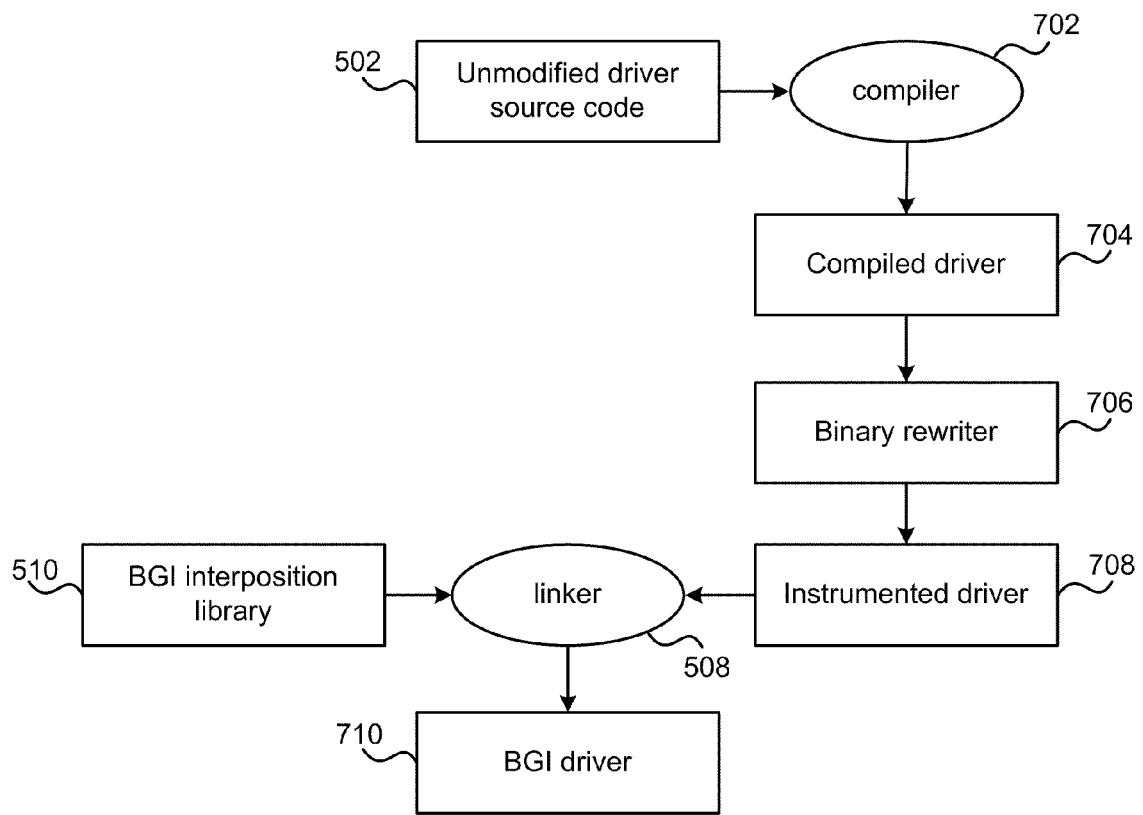

In an alternative embodiment to that shown in FIG. 5, the user may alternatively use any compiler 702, instead of the BGI compiler, (as shown in FIG. 7), and then a binary rewriter 706 may be used to perform similar transformations on binaries with symbols (i.e. to perform transformations on the compiled driver code 704 to generate an instrumented driver 708). Whilst this provides greater flexibility in the choice of compiler, the resulting code (BGI driver 710) may be slower than that generated using the BGI compiler (BGI driver 512 shown in FIG. 5). In an example implementation, the rewriter may be based on Vulcan, as described in 'Vulcan: Binary transformation in a distributed environment' by Srivastava et al (MSR-TR-2001-50, Microsoft Research 2001).

Although FIG. 5 shows the checks being inserted at compile-time, they may alternatively be added at any time before driver load-time (e.g. at installation time or at load-time) or at runtime. In an alternative embodiment to that shown in FIGS. 5 and 7, the user may alternatively use a dynamic binary re-writing tool to perform transformations on the running driver code to generate the instrumented driver code at runtime. In such an embodiment, a block of code may be rewritten just before the CPU transfers control to the block of code.

Figure 8:
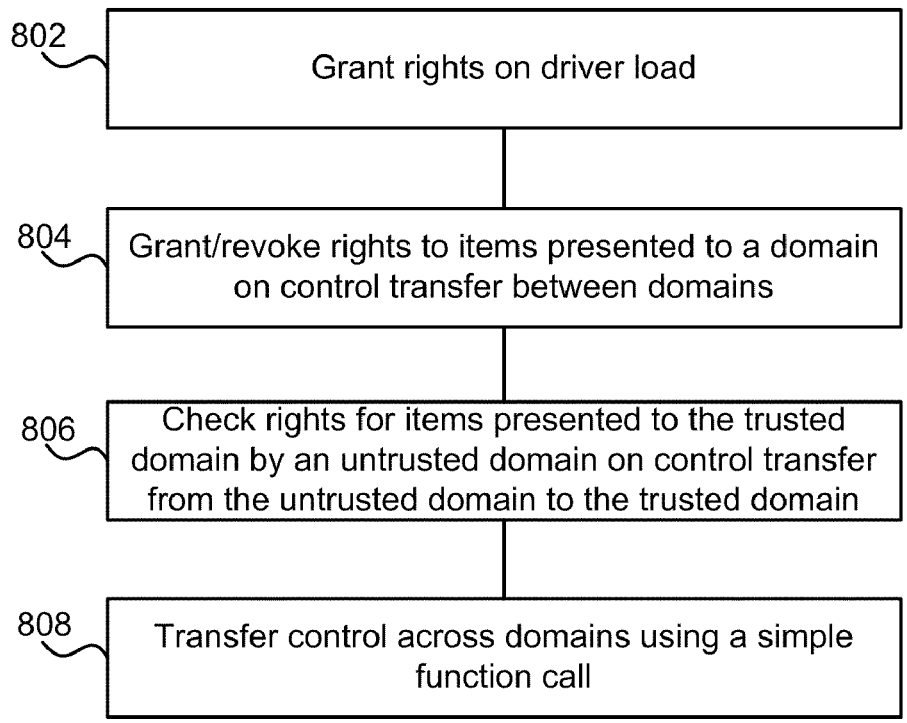
FIG. 8 is a flow diagram showing an example method of operation of the interposition library.

FIG. 8 is a flow diagram of an example method of operation of the interposition library 510. The interposition library 510 grants rights on driver load (block 802), such as granting write access to global variables and, in some embodiments, granting rights to enable indirect calls to address-taken functions (e.g. using the list of address-taken functions which is recorded by the compiler in block 606 of FIG. 6, as described above). The interposition library also grants or revokes rights to items (e.g. function arguments and returns) which are presented to the trusted domain by an untrusted domain, and vice versa, according to call semantics (block 804) on control transfers (in block 808) in either direction between the trusted domain and an untrusted domain, for example the interposition library may grant write access to fields that can be written and grant type rights to received objects. Where an access right is granted or revoked (in block 804), the access right data (which may be an ACL) is updated. In addition, the interposition library checks rights for items (e.g. function arguments and returns) which are presented to the trusted domain by an untrusted domain (block 806) on control transfers (in block 808) from the untrusted domain to the trusted domain, e.g. checking whether the arguments can be written and in some embodiments, checking if the arguments have the correct type.

As described above, wrappers are used to ensure that communications between an untrusted domain and the host portion (or between the untrusted domain and a trusted domain) are mediated by the interposition library. The interposition library contains two types of wrappers: wrappers (which may be referred to as kernel wrappers) which wrap host portion (e.g. kernel) functions that are called by the extension and extension wrappers wrap extension functions that are called by the host portion (e.g. the kernel). The wrappers transfer control across domains using a simple function call without changing page tables, stacks, or copying arguments (block 808), which makes the technique more efficient.

Although the blocks in FIG. 8 are shown in a particular order, it will be appreciated that the method blocks may be performed in any order and two or more method blocks may be performed concurrently.

The exact instrumentation which is added by the compiler/rewriter and interposition library is dependent upon the particular access rights which are used in a particular embodiment and the various access rights which may be used are described in more detail below.

There are a number of different access rights which may be implemented in the software fault isolation techniques described herein and different embodiments may use different combinations of these rights. These access rights may include read, write, icall, type and ownership rights and these are described in more detail below. All of these example access rights allow read access and the default state is that all domains have the read right to every byte in virtual address space. The embodiments described herein do not constrain read accesses because checking reads in software is expensive and the other checks prevent errors due to incorrect reads from propagating outside the domain; however, further embodiments may include checks on read accesses in addition to the checks described herein. In a first embodiment, only read and write access rights may be used. In a further embodiment, icall and/or type rights may also be used. Yet further embodiments may use read, write, icall, type and ownership access rights and such an embodiment is described in detail later. The different types of access rights, other than read and write, are described in more detail below.

The 'icall' access right may be used to enforce a form of control flow integrity that prevents extensions from bypassing the checks required by the protection model and ensures that control flow transfers across domains target only allowed entry points. If an embodiment uses icall rights, the technique grants an icall right on the first byte of functions that can be called indirectly or passed in kernel calls that expect function pointers.

Type rights may be used to enforce dynamic type safety for kernel objects. There is a different type right for each type of kernel object, for example, mutex and device. When an extension receives an object from the kernel, the interposition library grants the appropriate type right on the first byte of the object, grants write access to fields that can be written directly by the extension, and revokes write access to the rest of the object. Access rights change as the extension interacts with the kernel, for example, rights are revoked when the object is deleted. The interposition library also checks if extensions pass objects of the expected type in cross domain calls. This ensures type safety: extensions can only create, delete, and manipulate kernel objects using the appropriate interface functions. Type safety prevents many incorrect uses of the kernel interface. In the extension example provided earlier, the type rights may be used to ensure that 'e' is not used before it is initialized, that it is not written to after it is initialized but that it can be passed in kernel API calls that expect events.

Ownership rights may be used to keep track of the domain that should free an allocated object and which deallocation function to use.

In an example implementation, a domain cannot have more than one of these rights (read,write,icall,type or ownership) to the same byte of virtual address space.

An embodiment which uses at least the write, icall and type access rights, with 'read' being the default access right which is not specifically checked, provides strong isolation even with a complex kernel API: write integrity prevents bad writes, control-flow integrity (using the icall right) prevents bad control flow and type safety for kernel objects (using the type right) forces the correct use of the API.

The interposition library and the code inserted by the compiler/rewriter may use primitives to grant, revoke and check access rights. To improve security, an unmodified source code driver, or other existing extension, may be prevented from calling these primitives directly. This may be enforced using the compiler or re-writer.

In an example implementation two primitives may be used to manipulate ACLs: SetRight, which grants and revokes access rights, and CheckRight, which checks access rights before memory accesses. When a thread running in domain d calls SetRight(p,s,r) with r≠read, BGI grants d access right r to all the bytes in the range [p, p+s). For example, SetRight (p,s,write) gives the domain write access to the byte range. To revoke any other access rights to byte range [p, p+s), a thread running in the domain calls SetRight(p,s,read). To check ACLs before a memory access to byte range [p, p+s), a thread running in domain d calls CheckRight(p,s,r). If d does not have right r to all the bytes in the range, BGI throws an exception.

Although these two primitives, SetRight and CheckRight, may also be used with icall and type rights, in some embodiments, variants of these primitives may be defined and these variants may operate more efficiently. SetType(p,s,r) marks p as the start of an object of type r and size s that can be used by the domain and prevents writes to the range [p, p+s). CheckType(p,r) checks if the domain has the right to use p as the start of an object of type r. SetType(p,s,r) is semantically equivalent to SetRight(p,1,r); SetRight(p+1,s−1,read), and CheckType(p,r) is equivalent to CheckRight(p,1,r) but these variants provide specific optimizations. These primitives are used by way of example in the following description.

The wrappers, which are contained within the interposition library, use memory protection primitives, such as those detailed above, to grant, revoke, and check access rights according to the semantics of the functions they wrap. Since these primitives target the domain of the thread that calls them, the wrappers can be considered to run in the extension's domain even though they are trusted. An example implementation of the wrappers and interposition library is described in detail in the following paragraphs.

A kernel wrapper does not trust the caller but trusts the callee. It checks rights to the arguments supplied by the extension, it may revoke rights to some of those arguments, it calls the wrapped kernel function, and it may grant rights to some objects returned by the function. The sequence of steps executed by an extension wrapper is different because the caller is trusted but the callee is not. An extension wrapper may grant rights to some arguments, it calls the wrapped extension function, it may revoke rights to some arguments, and it checks values returned by the extension. There are different types of argument and result checks for the different types of rights: write, ownership, icall, and type.

Write and ownership checks prevent extension errors from making threads in other domains write to arbitrary locations. A kernel wrapper calls CheckRight(p,s,write) for each memory range argument, [p, p+s), that may be written to by the function being wrapped. An extension wrapper performs similar checks on memory ranges returned by the extension that may be written to by the caller. Write access is granted and revoked by the interposition library and code inserted by the compiler. The wrapper for the extension initialization function grants write access to global variables. Write access to local variables is granted and revoked by code inserted by the compiler.

Most existing fault isolation systems require a separate heap per domain but the fine-grained memory protection used in BGI allows all domains to share the same heap. The kernel wrappers for heap allocation functions grant write access to allocated memory and the wrappers for deallocation functions revoke it. The wrappers for allocation functions may also grant ownership rights on a guard before or after the allocated memory The BGI compiler may also insert guards between some variables, as described below. Guards are 8-byte memory areas that are not writable by extensions and it will be appreciated that guards may not be used in some embodiments. Ownership rights are used to identify the allocation function and the domain that allocated the memory. The wrappers for deallocation functions check that the calling domain has the appropriate ownership right and that it has write access to the region being freed. If these checks fail, they signal an error. Otherwise, they revoke the ownership right and write access to the memory being freed. This has the effect that only the domain that owns an object can free the object, that it must use the correct deallocation function, and that an object can be freed at most once (barring race conditions).

Call checks prevent extension errors from making threads in other domains execute arbitrary code. Some kernel functions take function pointer arguments. Since the kernel may call the functions they point to, the interposition library checks if the extension has the appropriate icall right to these functions. Kernel wrappers call CheckType(p,icallN) on each function pointer argument p before calling the kernel function they wrap, where N is the number of stack bytes used by the arguments to an indirect call through p. Some calling conventions used in Windows® drivers (for example, stdcall, fastcall or thiscall) require the callee to remove its arguments from the stack before returning. Therefore, the icall rights encode N to prevent stack corruption when functions with the wrong type are called indirectly. Extension wrappers check function pointers returned by extension functions.

The icall rights are also granted and revoked by the interposition library with help from the compiler. The compiler collects the addresses of all functions whose address is taken by the extension code and the number of bytes consumed by their arguments on the stack. This information is stored in a section in the extension binary. The wrapper for the driver initialization function calls SetType(p,1,icallN) for every function address p and byte count N in this section. When kernel functions return function pointers, their wrappers replace these pointers by pointers to the corresponding kernel wrappers and grant the appropriate icall rights. Since BGI does not grant icall rights in any other case, cross-domain calls into the domain can only target valid entry points: functions whose address was taken in the code of an extension running in the domain and kernel wrappers whose pointers were returned by the interposition library.

Type checks are used to enforce a form of dynamic type safety for kernel objects. There is a different type right for each type of kernel object. When a kernel function allocates or initializes a kernel object with address p, size s, and type t, its wrapper calls SetType(p,s,t) and grants write access to any fields that can be written directly by the extension. The wrappers for kernel functions that receive kernel objects as arguments check if the extension has the appropriate type right to those arguments, and wrappers for kernel functions that deallocate or uninitialize objects revoke the type right to the objects. Since many kernel objects can be stored in heap or stack memory allocated by the extension, BGI also checks if this memory holds active kernel objects when it is freed. Together these checks have the effect that extensions can only create, delete, and manipulate kernel objects using the appropriate kernel functions. Furthermore, extensions in an untrusted domain can only use objects that were received from the kernel by a thread running in the domain.

The checks performed by BGI go beyond traditional type checking because the type, i.e., the set of operations that are allowed on an object, changes as the extension interacts with the kernel. BGI implements a form of dynamic type-state analysis. For example in the example extension code listed above, the extension wrapper for ProcessRead grants irp right to the first byte of the IRP. This allows calls to IoSetCompletionRoutine and IoCallDriver that check if they receive a valid IRP. But the irp right is revoked by the wrapper for IoCallDriver to prevent modifications to the IRP while it is used by the disk driver. The extension wrapper for DiskReadDone grants the irp right back after the disk driver is done. Then the right is revoked by the wrapper for IoCompleteRequest because the IRP is deleted after completion. These checks enforce interface usage rules which have not been enforced in previously proposed techniques. Another example of how the checks in BGI go beyond traditional type checking are the checks in the wrappers for kernel functions that manage splay trees. Objects that can be inserted in splay trees contain a field of type RTL_SPLAY_LINKS. The wrapper for the insertion function takes a pointer p to one of these fields, calls CheckRight(p,sizeof(*p),write) followed by Set Type(p,sizeof(*p), splay) and inserts the object in the tree. The wrapper for the remove function calls CheckType(p,splay), removes the object from the tree, and calls SetRight(p,sizeof(*p),write). This prevents many incorrect uses of the interface, e.g., an object cannot be removed from a tree before being inserted, it cannot be inserted a second time without first being removed, and the extension cannot corrupt the tree pointers while the object is inserted in the tree. Wrappers for list functions are similar.

In addition to using access rights to encode object state, some kernel wrappers use information in the fields of objects to decide whether a function can be called without corrupting kernel state. This is safe because BGI prevents the extension from modifying these fields.

The operation of the wrappers can be further illustrated using the following two examples of kernel wrappers, which are wrappers for the functions KeInitializeDpc and KeInsertQueueDpc.

```
_BGI_KeInitializeDpc(PRKDPC d,
        PKDEFERRED_ROUTINE routine, PVOID a) {
    CheckRight(d, sizeof(KDPC), write);
    CheckFuncType(routine, PKDEFERRED_ROUTINE);
    KeInitializeDpc(d, routine, a);
    SetType(d, sizeof(KDPC), dpc);
}
BOOLEAN
    _BGI_KeInsertQueueDpc (PRKDPC d, PVOID a1,
        PVOID a2) {
    CheckType(d, dpc);
    return KeInsertQueueDpc(d, a1, a2);
}
```

The first example wraps the KeInitializeDpc function that initializes a data structure called a deferred procedure call (DPC). The arguments are a pointer to a memory location supplied by the extension that is used to store the DPC, a pointer to an extension function that will be later called by the kernel, and a pointer argument to that function. The wrapper starts by calling CheckRight(d, sizeof(KDPC), write) to check if the extension has write access to the memory region where the kernel is going to store the DPC. Then it checks if the extension has the appropriate icall right to the function pointer argument. CheckFuncType is a macro that converts the function pointer type into an appropriate icall right and calls CheckType. In this case, it calls CheckType(routine, icall16). If these checks succeed, the DPC is initialized and the wrapper grants the extension dpc right to the byte pointed to by d and revokes write access to the DPC object. This prevents the extension from writing directly to the object which contains a function pointer and linked list pointers. This improves security because if the extension corrupted the DPC object, it could make the kernel execute arbitrary code or write to an arbitrary location. KeInsertQueueDpc is one of the kernel functions that manipulate DPC objects. Its wrapper (the second example wrapper above) performs a type check to ensure that the first argument points to a valid DPC. These type checks prevent several incorrect uses of the interface, for example, they prevent a DPC object from being initialized more than once or being used before it is initialized.

In the examples, the wrapper for KeInitializeDpc passes the function pointer routine to the kernel. In some cases, the wrapper replaces the function pointer supplied by the extension by a pointer to an appropriate extension wrapper. This is not necessary in the example because routine returns no values and it is invoked with arguments that the extension already has the appropriate rights to (d, a, a1, and a2).

Although BGI adds additional work in writing wrappers, such as the examples given above, this only needs to be done once for each interface function by the OS vendor. Driver writers do not need to write wrappers or change their source code (as shown in FIGS. 5 and 7).

An example implementation of the compiler is now described. The compiler rewrites all calls to kernel functions to call the corresponding wrappers in the interposition library. The compiler also modifies extension code that takes the address of a kernel function to take the address of the corresponding kernel wrapper in the interposition library. For example, in the extension example provided earlier, the compiler rewrites:

```
        KeWaitForSingleObject(&e);
    as:
        __bgi__KeWaitForSingleObject(&e);
    which calls the following wrapper code in the interposition library:
        __bgi__ KeWaitForSingleObject(PRKEVENT e)
        {
            CheckType(e,event)
            KeWaitForSingleObject(e);
        }
```

The compiler also inserts calls to SetRight in function prologues to grant the domain write access to local variables on function entry. In the extension example, it inserts SetRight(&e,sizeof(e),write) in the prologue of the function ProcessRead. To revoke access to local variables on function exit, the compiler modifies function epilogues to first verify that local variables do not store active kernel objects and then call SetRight to revoke access.

The compiler inserts a check before each write in the extension code to check if the domain has write access to the target memory locations. It inserts CheckRight(p,s,write) before a write of s bytes to address p. The compiler also inserts checks before indirect calls in the extension code. It inserts CheckType(p,icallN) before an indirect call through pointer p that uses N bytes for arguments in the stack.

To prevent untrusted extensions from executing privileged instructions or bypassing the inserted checks as a result of programmer mistakes, the compiler does not allow inline assembly or calls to BGI's memory protection primitives. Use of inline assembly in Windows® drivers is already discouraged.

Together the checks inserted by the compiler and performed by the interposition library are sufficient to ensure control flow integrity: untrusted extensions cannot bypass the checks inserted by the compiler, direct calls target functions in the extension or wrappers of kernel functions that are named explicitly in the extension code, indirect calls target functions whose address was taken in the extension code or whose address was returned by the interposition library, returns transfer control back to the caller, and exceptions transfer control to the appropriate handler. BGI does not need additional checks on returns or exception handling because write checks prevent corruption of return addresses and exception handler pointers. Since the compiler is modified or a specific plug-in in an extensible compiler is used, it is possible to ensure that there are no other types of indirect control flow transfer, e.g. jump tables for switch statements.

The techniques described herein also prevent many attacks internal to a domain. Control flow integrity prevents the most common attacks that exploit errors in extension code because these attacks require control flow to be transferred to injected code or to chosen locations in code that is already loaded. BGI also prevents sequential buffer overflows and underflows that can be used to mount attacks that do not violate control flow integrity. These are prevented by the write checks because heap memory has guards and the compiler modifies the layout of global and local variables such that there is a guard between consecutive variables. The checks performed by heap allocation functions also prevent attackers from exploiting errors that corrupt heap metadata (e.g. double frees).

The above description describes techniques which use byte-granularity protection to provide strong isolation guarantees for existing (i.e. unmodified source code) extensions to software systems, such as kernel extensions. In order to achieve a low overhead, the following software implementation of byte-granularity memory protection may be used.

A small integer, referred to herein as a 'dright', is used to encode a pair with a domain and an access right. This is the basis of a compact representation for ACLs or other form of access right data. When a domain is created to contain a set of extensions, the number of distinct access rights used by the extensions is counted and then the same number of distinct drights is allocated to the domain. These drights are unique across domains except for the one corresponding to the read access right, which is the same (e.g. zero) for all domains. When a domain is destroyed, its drights can be reclaimed for use by other domains.

There are two optimizations which may be used to reduce the number of bits needed to encode drights. The first one reduces the number of distinct access rights used in extensions by exploiting a form of subtyping polymorphism in the kernel. Several types of kernel object have the same super type: they have a common header with an integer field that indicates the subtype. For example, there are 17 subtypes of dispatcher object in the WDM interface, which include events, mutexes, DPCs, and threads. This can be exploited by using a single type right for the super type and checking the field that indicates the subtype when necessary. This is safe because write access to this field is prevented. This optimization is very effective because this pattern is common.

The other optimization reduces the number of distinct icall rights. A single icall right is used per domain and the number of bytes used by function arguments is stored in an integer just before the function code. The write checks prevent untrusted extensions from modifying this integer. The indirect call checks start by checking if the domain has icall right to the first byte in the target function and then checking the number of bytes stored before the function. This optimization therefore permits the desired validation that indirect calls only target functions with the correct stack layout with the use of only a single icall dright value.

An example x86 implementation uses 1-byte drights and 47 distinct access rights across 16 test drivers. Many of these rights are used only by a particular type of driver (e.g., a file system or a network driver) or by drivers that use a particular version of the interface.

An example implementation of BGI which incorporates an optimization to make accessing the ACLs more efficient uses four data structures to store ACLs at runtime: a kernel table, a user table per process, a kernel conflict table, and a user conflict table per process. These tables are shared by all domains. The kernel and user tables are implemented as large arrays of drights to enable efficient access. The kernel table stores a dright for each n-byte slot of virtual address space in kernel space (where n is an integer) and a user table stores a dright for each n-byte slot of virtual address space in a process' user space to support direct access to user space. These data structures are optimized for the case when there is a single dright associated with an n-byte memory slot, i.e., when only one domain has an access right different from read to bytes in the slot and that domain has the same access right to all the bytes in the slot. These tables store a special dright value conflict in the entries for slots that do not satisfy these conditions. This value indicates that the drights for the bytes in the slot are stored in a conflict table.

A conflict table is a splay tree that maps the address of a slot to a list of arrays with n drights. Each array in the list corresponds to a different domain and each dright in an array corresponds to a byte in the slot. The kernel conflict table is used for slots in kernel space and a process' user conflict table is used for slots in the process' user space. The conflict tables are allocated in kernel space and process objects may be modified to include a pointer to their user conflict table. Therefore, there is a single kernel table and a user table per process that is selected automatically by the virtual memory hardware. The kernel allocates physical pages to the tables on demand when they are first accessed and zeroes them to set access rights to read for all domains. This prevents incorrect accesses by default, for example, it protects the tables themselves from being overwritten. Since some extension code cannot take page faults, the kernel may also be modified to pre-allocate physical pages to back kernel table entries that correspond to pinned virtual memory pages.

In many embodiments, 8-byte slots are used (n=8) because the dynamic memory allocators in x86 Windows® allocate 8-byte aligned memory in multiples of 8 bytes. However, other values of n may alternatively be used.

Although the above example refers to 32-bit (x86) architectures, the same strategy could be used to implement BGI on the x64 architecture. Even though it is necessary to reserve a large amount of virtual memory for the tables in a 64-bit architecture, only top level page table entries need to be allocated to do this. Additional page meta-data and physical pages only need to be allocated to the tables on demand.

Figure 9:
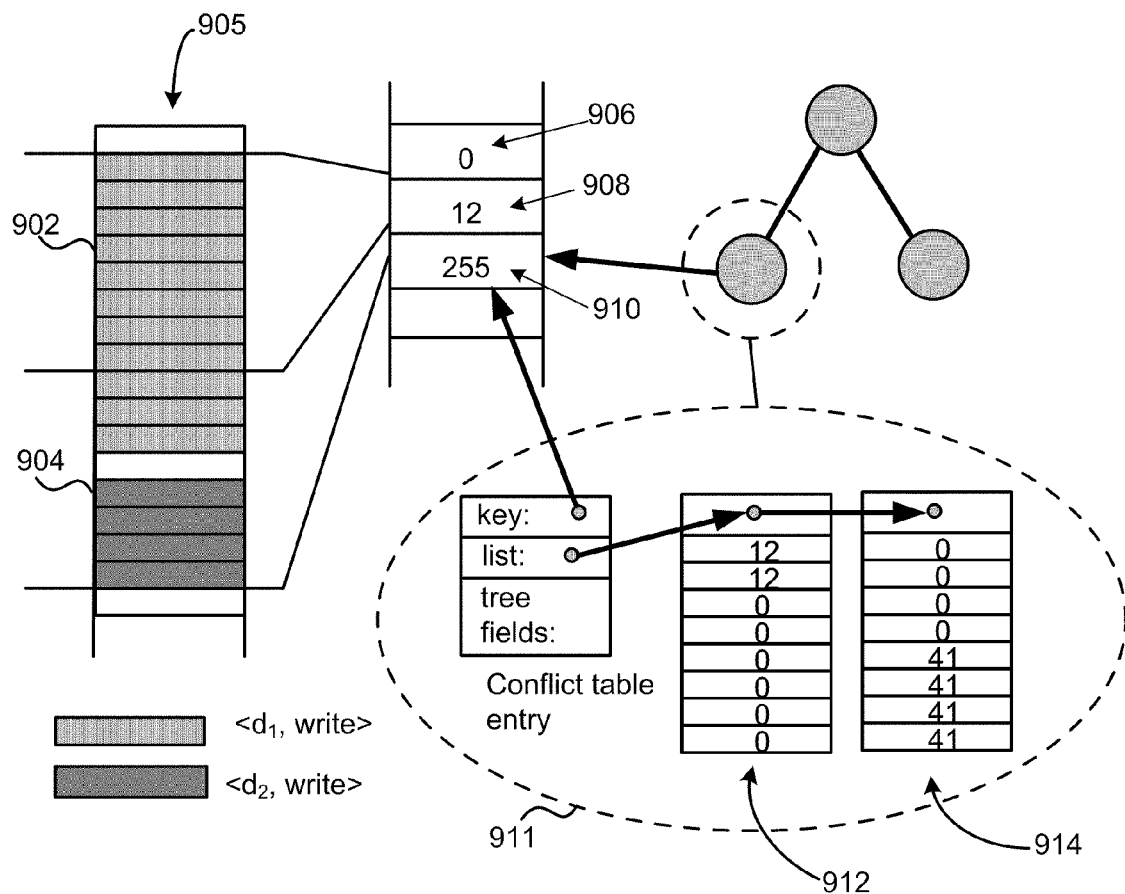
FIG. 9 is a schematic diagram of example data structures which may be used to store the ACL.

FIG. 9 shows an example of how the tables are used to record ACLs and in this example, 8-byte slots are used (i.e. n=8). There are two untrusted domains in this example d1 and d2. As shown in the diagram for system memory, d1 has write access to the 10 bytes 902 shaded light grey and d2 has write access to the 4 bytes 904 shaded dark grey. The figure also shows how these bytes are partitioned into slots and the corresponding entries in the kernel table (data structure 905). The first entry 906 in the kernel table has dright zero because all the bytes in the corresponding slot have the default ACL<d1, read>,<d2, read>. The second entry 908 has dright 12, which encodes <d1,write>, because all the bytes in the corresponding slot are writable by d1 and no other untrusted domain has rights other than read to these bytes. The third entry 910 has dright 255, which encodes a conflict, because both d1 and d2 have write access to some bytes in the slot. Since there is a conflict, there is an entry in the kernel conflict table keyed by a pointer to the third entry. The conflict table entry points to a list of arrays (data structure 911). The first array 912 describes the access rights of d1 and the second 914 the access rights of d2. The first two entries in the first array have dright 12 because d1 can write to the first two bytes in the slot, and the last four entries in the second array have dright 41 because d2 can write to the last four bytes in the slot and 41 encodes <d2,write> in this example. The other entries in the two arrays have dright zero because the corresponding bytes can only be read by the two domains.

To achieve good performance both in space and in time, accesses to the conflict tables should be avoided where possible and one or more optimizations can be used to ensure that most slots have a single associated dright. Examples of these optimizations are described below.

First, BGI does not restrict read accesses. Therefore, supporting the common cases of read-read and read-write sharing across domains does not require accesses to conflict tables. It has been observed that it is rare for two extensions to have non-read access rights to the same byte at the same time and many embodiments do not allow an untrusted domain to have a non-read right to a byte of memory that is writable by another untrusted domain. Similarly, in some embodiments, different domains do not have icall rights to the same function because they are only granted icall rights to functions in extensions they contain or to wrappers in the copies of the interposition library linked with those extensions. However, it is possible for different extensions to have type rights to the same kernel object.

Second, BGI uses techniques such that, for most slots, a domain has the same access right to all the bytes in the slot. As described above, in many embodiments, 8-byte slots are used because the dynamic memory allocators in x86 Windows® allocate 8-byte aligned memory in multiples of 8 bytes.

A first technique which may be used to achieve the same access right for a slot involves the compiler (or a re-writer with symbols) making changes to the layout of data (block 612 in FIG. 6) at compile-time. The BGI compiler changes the layout of local and global variables in the extension code either to lay them out in N-byte slots (where in an example, N=8 and N may be equal to n) or to align them on N'-byte boundaries (where N' is a divisor of N, for example N'=4) and insert pads around them. The use of N'-byte alignment and pads allows BGI to grant write access to all the slots that overlap a variable location while maintaining guard slots before and after the variable. These guard slots are not writable and prevent sequential overflows and underflows as discussed previously.

A naive implementation of SetType and CheckType would always access the kernel conflict table because they set and check access rights to the first byte of an object. However, a further optimization which uses the fact that most objects are 8-byte aligned enables BGI to implement these primitives efficiently. The optimized implementation of SetType(p,s,r) checks if p is 8-byte aligned and s is at least 8. If this check succeeds, it executes SetRight(p,8,r); SetRight(p+8,s−8, read), which avoids the access to the conflict table. Otherwise, it executes SetRight(p,1,r); SetRight(p+1,s−1, read) as before. Similarly, CheckType(p,r) checks if p is 8-byte aligned and the dright in the kernel table corresponds to access right r for the domain. Only if this check fails, does it access the conflict table to check if the byte pointed to by p has the appropriate dright. To further reduce the number of accesses to the conflict table, the BGI compiler aligns local variables and fields in local driver structs on 8-byte boundaries if they have a kernel object type. Additionally, the BGI compiler ensures that functions are at least 8-byte aligned (for example, 16-byte aligned).

A further optimization (in relation to conflict table access) avoids accesses to the conflict table while allowing a domain to have different access rights to the bytes in a slot in two common cases: when a domain has right write to the first half of the bytes in the slot and read to the second half of the bytes, and when a domain has right read to the first half of the bytes in the slot and write to the second half of the bytes. BGI uses two additional drights per domain to encode these cases. This is used to avoid accesses to conflict tables when a domain is granted write access to individual fields in a kernel object whose layout cannot be modified.

Figure 10:
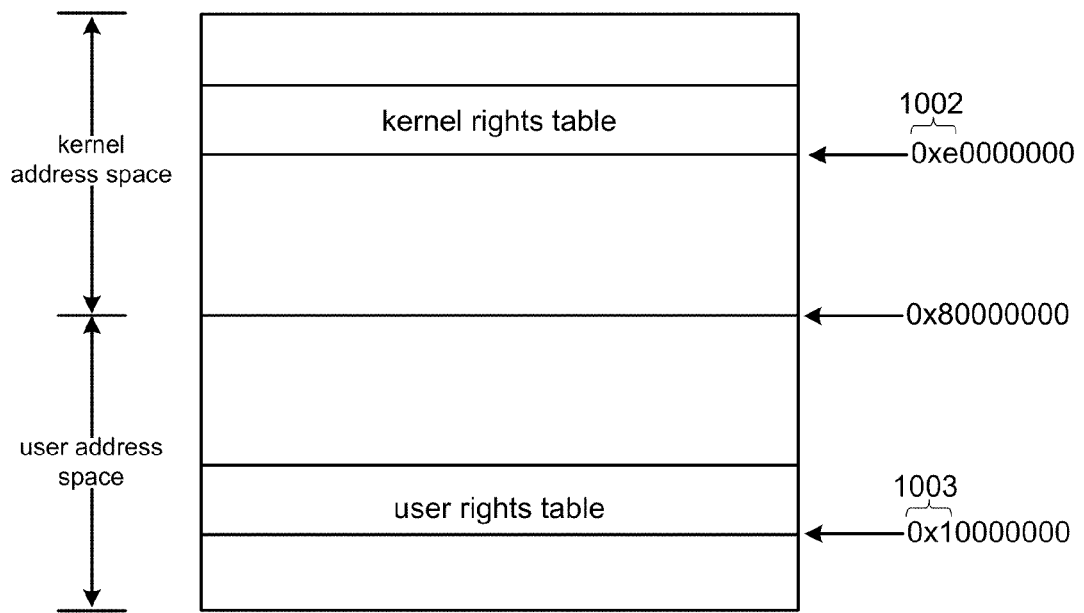
FIG. 10 shows an example of the location of the user and kernel tables in the address space of an x86 Windows® operating system.

In another optimization, the kernel may be modified to reserve virtual address space for the kernel table at address 0xe0000000 when the system boots, and to reserve virtual address space in every process at address 0x10000000 when the process is created as shown in FIG. 10. This simplifies the process of computing the address of table entries, as is described in more detail below.

Experiments have shown that these optimizations are very effective. Since most ACLs can be represented without using the conflict tables, ACLs can be modified and checked efficiently and BGI introduces a space overhead of approximately 12.5%. The space overhead could be reduced significantly on the x64 architecture because it imposes stricter alignment requirements than the x86. Since in x64 Windows® dynamic memory allocators allocate 16-byte aligned memory in multiples of 16 bytes, pointers are 8-byte aligned, and stack variables are 8-byte aligned, 16-byte memory slots could be used without significantly increasing the use of the conflict tables. This reduces the space overhead by nearly 50%.

The optimizations described above enable efficient implementations of SetRight and CheckRight. In the common case, SetRight sets the access rights to all the bytes in a sequence of slots to write or read. The following code sequence shows an efficient way to implement SetRight(p,32,write) in this case.

mov eax,ebx
    sar eax,3
    btc eax,0x1C
    mov dword ptr [eax],0x02020202

In this example and the subsequent two examples, the dright for the write right and the domain that runs the sample code sequences is 0x02. The dright values are immediates in the code. When the extension is added to a domain, these values must be changed to match the drights allocated to the domain. This is similar to a relocation and requires the compiler to record the locations of these constants in the code.

Initially, pointer p is in register ebx and it can point either to kernel or to user space. The first instruction moves p into register eax. Then, the sar and btc instructions compute the address of the entry for the slot pointed to by p in either the kernel or the user table. They store this address in eax. This code sequence computes the address of the entry in the right table without checking if p points to kernel or user space and without using the base addresses of the tables. This can be explained with reference to FIG. 10. Addresses in user space have the most significant bit set to 0 and addresses in kernel space have the most significant bit set to 1. The sar instruction shifts eax right by 3 bits and makes the 3 most significant bits equal to the most significant bit originally in eax. After executing sar, the four most significant bits in eax will be 1111 for a kernel address and 0000 for a user address. The btc instruction complements the least significant of these 4 bits. So the most significant 4 bits in the result are 0xe when p is a kernel address (see arrow 1002 in FIG. 10) and 0x1 when it is a user address (see arrow 1004 in FIG. 10). The remaining bits in eax are the index of the table entry for the slot pointed to by p. The final mov instruction sets four entries in the table to 0x02, which grants the domain write access to [p, p+32).

Although the code sequence is described with reference to the x86 architecture, it could also be used on the x64 architecture by replacing 32-bit by 64-bit registers (because pointers are 64 bits long), shifting by 4 instead of 3 (because of the use of 16-byte slots), and complementing a different bit (because the table bases would be at different addresses).

The BGI compiler inserts a code sequence similar to the one given above in the prologues of instrumented functions to grant write access to local variables. The code sequence to revoke write access to local variables on function exit is more complicated because it must check if a local variable stores an active kernel object and an example is shown below.

```
        push    eax
        lea     eax,[ebp-38h]
        sar     eax,3
        btc     eax,0x1C
        add     eax,5
        xor     dword ptr [eax-4],0x02020202
        jne     L1
L2:     pop     eax
        ...
        ret     4
        ...
L1:     push    eax
        lea     eax,[ebp-38h]
        push    eax
        push    6
        call    _BGI_slowRevokeAccess
        jmp     L2
```

The code in the example above stores the address of the guard before the first local variable in eax (after saving eax) and the sar and btc instructions compute the address of the kernel table entry for the guard. The add instruction updates eax to point to the table entry right after the last table entry modified by the xor. It adds 5 to eax to account for the guard slot before the local variable and the 4 slots occupied by the variable. If the local variable does not store any kernel object, the xor revokes access to the local variable and the branch is not taken. Otherwise, the branch is taken and the _BGI_slowRevokeAccess function is called. This function undoes the failed xor and checks if the table entries for the slots occupied by the local variables have drights corresponding to kernel objects. If it finds an active kernel object, it signals an error. When functions have more local variables, the compiler adds another add, xor, and jne for each variable.

The BGI compiler also inserts checks before writes and indirect calls and an efficient code sequence that implements CheckRight(p,1,write) is shown below.

```
        mov     eax,ebx
        sar     eax,3
        btc     eax,1Ch
        cmp     byte ptr [eax],2
        je      L1
        push    ebx
        call    _BGI_slowCheck1
L1:
```

Initially, p is in ebx. The code computes the address of the table entry for the slot pointed to by p in the same way as SetRight. Then, the cmp instruction checks if the entry has dright 0x02. If the check fails, the code calls one of the _BGI_slowCheck functions. These functions receive a pointer to the memory range being checked and their name encodes the size of the range. In this case, the code calls _BGI_slowCheck1, which checks if the table entry contains a dright that encodes write access to the half slot being accessed and, if this fails, checks the dright for the appropriate byte in the conflict table. The indirect call check is similar but it also checks the number of stack bytes stored before the function and it does not have a slow path because functions are always 16-byte aligned.

In another optimization to improve efficiency, the BGI compiler may use simple static analysis to eliminate SetRight and CheckRight sequences. It does not add SetRight for local variables that are not arrays or structs and whose address is not taken. It also eliminates CheckRight before the writes to these variables.

The interposition library implements SetRight(p,s,r) similarly to the compiler but uses memset to set drights when s is not known statically or is large. Additionally, it must deal with the case where p or p+s are not 8-byte aligned. In this case, the interposition library sets drights as before for slots that are completely covered by the byte range but calls a function to deal with the remaining slots. This function sets the corresponding table entries to the drights that encode write access to half a slot when possible. Otherwise, it records drights for individual bytes in the appropriate conflict table. The interposition library implements CheckRight as in the example given above but it iterates the check for larger memory ranges. To improve performance, a function may be used that compares four drights at a time when checking write access to large memory ranges.

In some embodiments, further static analysis may be used to reduce the number of checks which are performed.

BGI avoids synchronization on table accesses as much as possible to achieve good performance, but uses enough synchronization to ensure that there are no false positives (i.e. that an error is only signalled when there is one). This has the effect that BGI may fail to isolate errors in some uncommon schedules when there are races; however, it is hard for attackers to exploit these races to escape containment (if it is assumed that they do not write the extension code).

Synchronization is not used when granting or revoking write access to all the bytes in a slot, which is the common case. Synchronization is not necessary because: (1) it is an error for an untrusted domain to have non-read rights to a byte of memory that is writable by another untrusted domain and (2) there is a race in the code when threads running in the same domain attempt to set conflicting drights on the same byte. Synchronization is needed when granting and revoking type rights and when granting and revoking write access to half a slot. Atomic compare-and-swap on kernel or user table entries may be used to prevent false positives in this case. Similarly, synchronization is needed when granting or revoking rights involves an access to a conflict table. In this case, an atomic swap is used to record the conflict in the appropriate kernel or user table entry and there is a spin lock per conflict table. Since these tables are rarely used, contention for the lock is not a problem.

There is no synchronization in the fast path when checking rights. To prevent false positives (i.e. signaling an error when one does not exist), the slow path retries the check after a memory barrier and uses spin locks to synchronize accesses to the conflict tables when needed. The right checks are not atomic with the access they check. This has the effect that access will not be prevented when it should have been allowed but where a racing thread revokes access (i.e. the right is revoked between the check and the access), access may not be prevented when it should have been and the technique fails to signal an error.

A simple recovery mechanism may be implemented for misbehaving domains. When an extension in a domain fails, BGI can unload the extensions in the domain, release all resources they hold, and then reload and restart them.

An embodiment of BGI uses Structured Exception Handling (SEH) to implement recovery: extension wrappers call the extension function within a try clause, BGI raises an exception when it detects a failure, and the except clause handles the exception by starting recovery (if not started already). If the domain is already recovering, the except clause simply returns an appropriate error code. Recovery support requires wrapping of additional extension functions to ensure there is an exception handler in the stack whenever extension code runs, e.g. functions in deferred procedure calls must be wrapped.

Running extension code during recovery is avoided because domain state may already be corrupt. Extension wrappers return an appropriate error code when recovery is in progress without calling the extension function. Kernel wrappers check if the domain is recovering after the kernel function returns and they raise an exception if it is. This exception is handled by the except clause in an extension wrapper, which returns an appropriate error code.

In an example embodiment, BGI uses the Plug and Play (PnP) manager in the Windows® kernel to unload and restart misbehaving domains. This simplifies recovery because the PnP manager deals with many of the synchronization issues necessary to unload a driver safely. When BGI starts recovery, it invokes the PnP manager to send a sequence of requests (IRPs) to the recovering extensions: the first IRP asks an extension if a device it manages can be removed and the second informs the extension that the device is being removed. The extension wrappers for the functions that handle these IRPs perform driver-independent processing to advance the PnP state machine until the extension is unloaded. The extension wrapper that handles the second IRP also invokes a small device-specific function to reset the device hardware.

When there are no more references to the devices managed by an extension, the PnP manager invokes the extension's unload function. The extension wrapper for the last unload function called by the PnP manager releases resources held by the extensions in the domain being recovered. Since the drights in BGI's tables record all the information necessary to release these resources, there is no need for a separate object tracker (which can introduce a significant overhead). The wrapper walks the BGI tables to find drights belonging to the domain. It frees heap memory and calls the appropriate functions to release different types of kernel objects, for example, it completes IRPs owned by the domain. After the wrapper returns, the PnP manager reloads and restarts the extensions in the domain.

Figure 11:
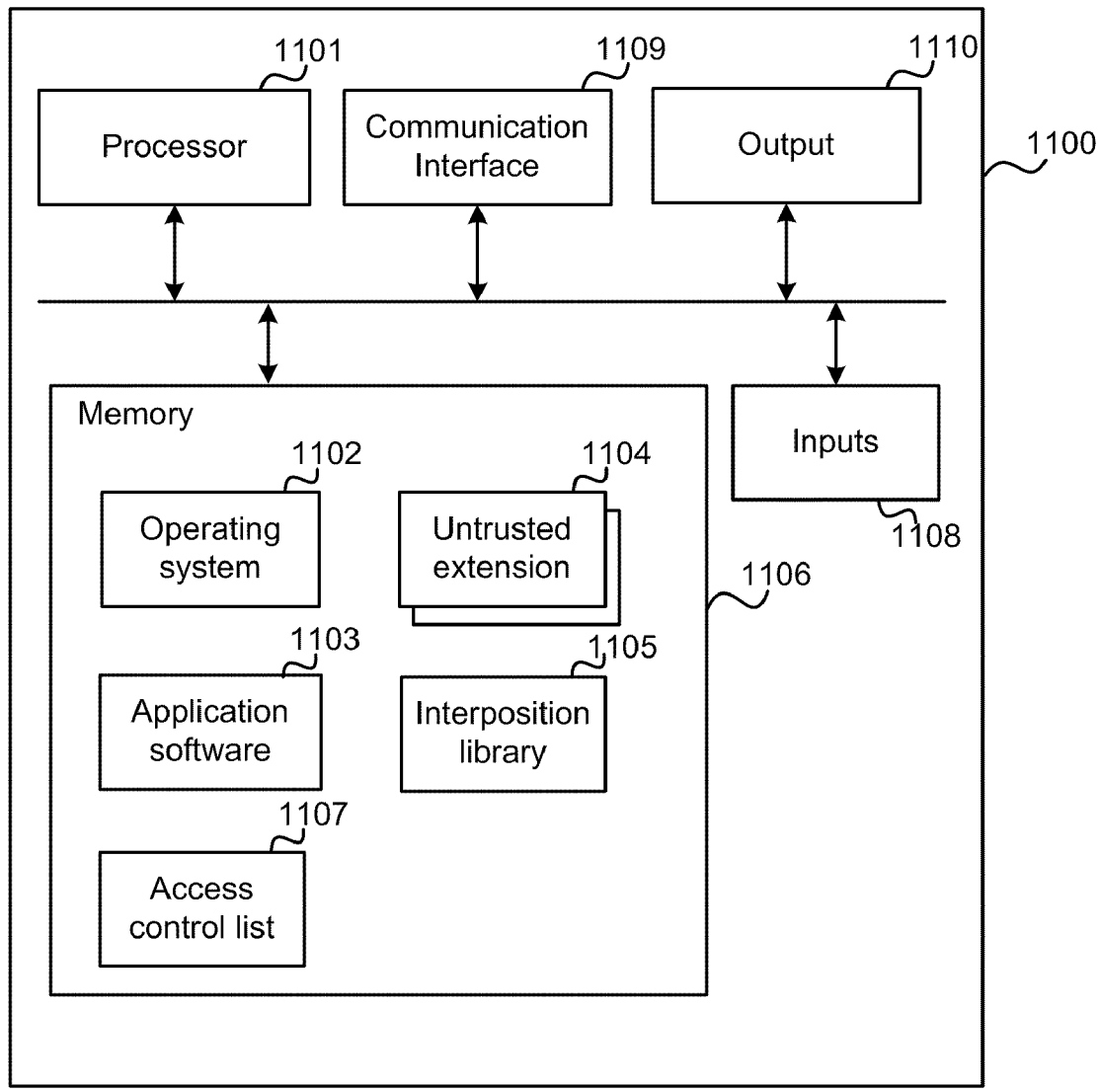
FIG. 11 illustrates an exemplary computing-based device in which embodiments of the BGI techniques may be implemented.

FIG. 11 illustrates various components of an exemplary computing-based device 1100 which may be implemented as any form of a computing and/or electronic device, and in which embodiments of the techniques and methods described herein may be implemented.

Computing-based device 1100 comprises one or more processors 1101 which may be microprocessors, controllers or any other suitable type of processors for processing computing executable instructions to control the operation of the device in order to implement BGI (e.g. the methods shown in FIGS. 1, 6 and/or 8). Platform software comprising an operating system 1102 or any other suitable platform software may be provided at the computing-based device to enable application software 1103 to be executed on the device. In addition, one or more untrusted extensions 1104 and an interposition library 1105 are also provided. As described above, these untrusted extensions 1104 are run, at run-time, in a separate domain from the kernel of the operating system 1102 and calls between domains are mediated by the interposition library 1105.

The computer executable instructions may be provided using any computer-readable media, such as memory 1106. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1106 may also be used to store an access control list 1107 (or other access control data) for each byte of virtual address space. As described above, the ACL may comprise a number of different data structures (e.g. as shown in FIG. 9).

The computing-based device 1100 also comprises one or more inputs 1108 which are of any suitable type for receiving media content, Internet Protocol (IP) input, etc. The device also comprises communication interface 1109. An output 1100 is also provided such as an audio and/or video output to a display system integral with or in communication with the computing-based device. The display system may provide a graphical user interface, or other user interface of any suitable type.

Where the computing-based device 1100 is used to create the instrumented and linked extension (e.g. block 102 of FIG. 1 and FIGS. 5-7), the memory 1106 may also be used to store the computer executable instructions for the compiler/linker/rewriter (not shown in FIG. 11).

Although the techniques described above are not aimed at isolating a malicious driver, the techniques may be used in combination with a verifier, such as a static verifier, which verifies that the instrumented and linked extensions have the appropriate checks before they are allowed to execute.

The above description describes a number of different optimizations. It will be appreciated that an embodiment of BGI may not include any of the optimizations or may comprise any combination of one or more of the optimizations described.

The techniques described above improve the reliability and security of a software system which runs extensions (an extensible software system). Existing extensions, such as drivers, can be isolated with low overhead and faults can be contained during production, preventing system corruption or attackers from "owning" the host and enables a faulty domain to be recovered. Additionally, the techniques described can also be used as a bug-finding tool (e.g. during testing/diagnostics). For example, BGI has been shown to be able to find incorrect uses of the kernel interface in drivers that had previously been extensively tested using existing driver verification tools. Since BGI has a low overhead (experiments showed a 6.4% CPU overhead on average), it can be used not only for pre-release testing but it can also be used to collect better information about bugs in customer machines than is currently possible with the available error reporting tools.

Although the present examples are described and illustrated herein as being implemented in a Windows® operating system, the system described is provided as an example and not a limitation. As those skilled in the art will appreciate, the present examples are suitable for application in a variety of different types of operating systems or other software systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of running an extensible software system comprising, on a computing system:
running a host portion of the software system in a first domain;
running at least one extension to the software system in a second domain, the extension comprising an untrusted extension instrumented to include at least one access right check;
storing access control data for substantially each byte of relevant virtual address space comprising:
storing a first data structure comprising access right data associated with substantially each memory slot, a memory slot comprising a fixed number of bytes of relevant virtual address space;

storing a second data structure comprising access right data associated with each byte of virtual address space in at least one memory slot;

mediating calls between the first domain and the second domain using an interposition library comprising a plurality of wrappers for functions; and checking access rights before a write operation using the access control data comprising:

using the first data structure to obtain access right data for a memory slot comprising a byte of virtual address space to be written; and if the access right data obtained using the first data structure indicates a conflict, using the second data structure to obtain access right data for the byte of virtual address space to be written.

2. A method according to claim 1, further comprising: updating the access control data based on instrumentation added to the untrusted extension and wrappers in the interposition library.

3. A method according to claim 1, wherein mediating calls between the first domain and the second domain using the interposition library comprises:

using the access control data to check access rights for items presented to the first domain by the second domain on control transfers from the second domain to the first domain; and updating access rights in the access control data for items presented to a domain on control transfers between the domains.

4. A method according to claim 1, wherein the access rights comprise write and indirect call rights and the method further comprising: checking access rights before an indirect call.

5. A method according to claim 1, wherein the access rights comprise write and type rights and the method further comprising: checking a type right of an object passed in a call between domains.

6. A method according to claim 1, wherein the access rights comprise write and ownership rights and the method further comprising: checking an ownership right of an allocated object.

7. A method according to claim 1, wherein the access control data comprises an access control list for substantially each byte of relevant virtual address space.

8. A method according to claim 1, wherein access right data comprises an integer arranged to encode a pair comprising a domain and an access right.

9. A method according to claim 1, wherein the extension is further instrumented to align local and global variables in memory slots.

10. A method according to claim 1, wherein the extension is further instrumented to include code to grant and revoke access rights.

11. A method according to claim 1, wherein the extension is further instrumented to rewrite calls to functions in the host portion of the software system to call wrappers stored in the interposition library.

12. A method according to claim 1, wherein the extension is further instrumented to modify code in the extension that takes an address of a host portion function to take an address of a corresponding wrapper in the interposition library.

13. A method according to claim 1, wherein the host portion comprises a kernel and the extension comprises an untrusted driver.

14. A method according to claim 1, further comprising, on the computing system, running a trusted extension to the software system in the first domain.

15. A computer-implemented method of compiling an extension to a software system comprising, on a computing system:

receiving, at an input, the extension to the software system;

inserting code into the extension to set and check access rights, the access rights being stored in an access control list for substantially each byte of virtual address space;

the code to set access rights comprising code to update a first data structure comprising access right data associated with substantially each memory slot, a memory slot comprising a fixed number of bytes of virtual address space and a second data structure comprising access right data associated with each byte of virtual address space in at least one memory slot;

the code to check access rights comprising code to access the first data structure to obtain access right data for a memory slot comprising a byte of virtual address space to be written; and code to access the second data structure to obtain access right data for the byte of virtual address space to be written if the access right data obtained using the first data structure indicates a conflict; and rewriting calls to functions in a host portion of the software system to call wrappers stored in an interposition library.

16. A method according to claim 15, further comprising: aligning data in slots comprising a fixed number of bytes.

17. A method according to claim 15, further comprising: creating and storing a list of address-taken functions.

18. A method according to claim 15, further comprising: modifying code in the extension that takes an address of a host portion function to take an address of a corresponding wrapper in the interposition library.

19. A computing device comprising:

a processor; and memory arranged to store an operating system and at least one untrusted driver, wherein the at least one untrusted driver is instrumented to include at least access right check and wherein the memory is further arranged to store executable instructions to cause the processor to:

run a kernel of the operating system and the untrusted driver in separate domains;

maintain an access control list for substantially each byte of relevant virtual address space comprising:

storing a first data structure comprising access right data associated with substantially each memory slot, a memory slot comprising a fixed number of bytes of relevant virtual address space; and storing a second data structure comprising access right data associated with each byte of virtual address space in at least one memory slot;

mediate calls between domains using an interposition library, the library comprising a plurality of wrappers for kernel and driver functions; and check access rights before each write operation and before each indirect call using the access control list comprising:

using the first data structure to obtain access right data for a memory slot comprising a byte of virtual address space to be written; and if the access right data obtained using the first data structure indicates a conflict, using the second data structure to obtain access right data for the byte of virtual address space to be written.

* * * * *